(12) United States Patent
Nakamura et al.

(10) Patent No.: US 6,624,253 B2
(45) Date of Patent: Sep. 23, 2003

(54) PROPYLENE TYPE RESIN COMPOSITION, FILM MADE THEREOF, AND LAMINATED RESIN FILM

(75) Inventors: Yasunori Nakamura, Yokkaichi (JP); Takao Tayano, Yokkaichi (JP); Tadashi Sezume, Yokkaichi (JP)

(73) Assignee: Japan Polychem Corporation, Tokyo (JP)

( * ) Notice: Subject to any disclaimer, the term of this patent is extended or adjusted under 35 U.S.C. 154(b) by 141 days.

(21) Appl. No.: 09/902,698

(22) Filed: Jul. 12, 2001

(65) Prior Publication Data

US 2002/0041972 A1 Apr. 11, 2002

(30) Foreign Application Priority Data

Jul. 12, 2000 (JP) ........................... 2000-211751
Jul. 12, 2000 (JP) ........................... 2000-211752

(51) Int. Cl.⁷ .................... B32B 27/32; C08L 23/14; C08L 23/10
(52) U.S. Cl. .................... 525/240; 428/515; 428/523; 428/484; 524/543
(58) Field of Search .................... 525/240; 524/543; 428/523, 484, 515

(56) References Cited

U.S. PATENT DOCUMENTS

| | | | |
|---|---|---|---|
| 4,293,608 A | 10/1981 | Isaka et al. | 428/220 |
| 5,468,527 A | 11/1995 | Peiffer et al. | 428/35.7 |
| 5,998,039 A * | 12/1999 | Tanizaki et al. | 428/516 |
| 6,063,483 A * | 5/2000 | Peiffer et al. | 428/213 |
| 6,143,813 A | 11/2000 | Sezume et al. | 524/127 |

FOREIGN PATENT DOCUMENTS

WO  WO 95/02638  1/1995

* cited by examiner

*Primary Examiner*—D. Lawrence Tarazano
(74) *Attorney, Agent, or Firm*—Oblon, Spivak, McClelland, Maier & Neustadt, P.C.

(57) ABSTRACT

A propylene type resin composition comprising from 95.0 to 99.999 parts by weight of component (A) which is a propylene/α-olefin random copolymer polymerized by a metallocene catalyst, and from 0.001 to 5.0 parts by weight of component (C) which is a polyethylene wax, wherein components (A) and (C) satisfy the following conditions:

Component (A): Propylene/α-olefin random copolymer
 1) Melt index at 230° C.: 2 to 30 g/10 min
 2) Main melting peak temperature (Tm) obtained by DSC: 110 to 145° C.

Component (C): Polyethylene wax
 1) Density: 0.94 to 0.98 g/cm³
 2) Melt viscosity at 140° C.: At least 10 cps.

18 Claims, No Drawings

PROPYLENE TYPE RESIN COMPOSITION, FILM MADE THEREOF, AND LAMINATED RESIN FILM

The present invention relates to a propylene type resin composition having high transparency and low blocking tendency, a film made thereof, and a laminated resin film.

As compared with a conventional propylene type resin obtained by a Ziegler catalyst containing Ti, Mg, Cl, etc., as the main components, a propylene type resin produced by means of a metallocene catalyst has a large melting point drop relative to the comonomer content, and a film obtained by T-die molding has low blocking tendency and is excellent in a low temperature heat sealing property. Therefore, its development for application to a sealant film is very much expected.

However, as a result of a study conducted by the present inventors, it has been found that the propylene type resin obtained by a metallocene catalyst provides excellent transparency when molded into a film by means of a T-die if the molding is carried out by taking a sufficient time for cooling the film, for example, by lowering the taking up speed, but the transparency decreases if the cooling tends to be insufficient, for example, by increasing the molding speed.

The cause may be such that the polypropylene type resin obtained by a metallocene catalyst usually has a narrow molecular weight distribution, and aligned crystals tend to be small during molding of the film, whereby crystallization tends to delay, and depending upon the cooling conditions, spherulites in the film are likely to grow large, whereby irregularities are likely to form on the film surface to reduce the transparency of the film.

In order to sufficiently cool the film, it is desired to lower the molding speed. However, in a commercial production line, the productivity is important, and it is not desirable to lower the molding speed. Otherwise, it is conceivable to lower the cooling temperature. However, in order to lower the cooling temperature, a cooling apparatus of a large size will be required, which will create a problem of an increase in the production cost, Accordingly, it is necessary to develop a resin whereby the product quality can be secured without depending on the molding conditions.

For this purpose, it is conceivable to add a nucleating agent to let crystal nuclei form. However, when a nucleating agent is added, it becomes important to effectively disperse the nucleating agent in the resin, and there will be a problem that due to inadequate dispersion, deterioration of the quality of the film is likely to result. Further, there is a problem that by the addition of a nucleating agent, no adequate effect for improving the transparency can be attained.

Accordingly, it is desired to develop a propylene type resin whereby a resin film excellent in transparency can be obtained even when the production speed is high.

Further, a resin film is used widely in an application as a packaging material whereby not only a low temperature impact resistance but also a low temperature heat sealing property is required. Especially, in recent years, the packaging process tends to have a high speed, whereby it is important that heat sealing can be carried out at a low temperature, and it has been common to employ a technique of incorporating an elastomer. However, if an elastomer is incorporated, crystallization will further be lowered, whereby there is a problem that the transparency of the film decreases.

Under these circumstances, it is also desired to develop a propylene type resin whereby a resin film is obtainable which is excellent in transparency even when the production speed is high and which is excellent not only in a low temperature impact resistance but also in a low temperature heat sealing property.

Accordingly, it is an object of the present invention to provide a propylene type resin composition whereby the cooling condition dependency of the film transparency can be reduced, and a film having a good surface smoothness and being excellent in transparency, can be obtained and which is excellent in moldability in T-die molding, a propylene type resin film made thereof, and a laminated resin film.

Another object of the present invention is to provide a propylene type resin composition whereby a film having excellent low temperature impact resistance and low temperature beat sealing properties in addition to the above-mentioned excellent characteristics, can be obtained, a propylene type resin film made thereof, and a laminated resin film.

As a result of an extensive study, the present inventors have found that a film excellent in transparency can be obtained by adding a small amount of a polyethylene wax having certain specific properties to a certain specific propylene/$\alpha$-olefin random copolymer polymerized by a metallocene catalyst. The present invention has been accomplished on the basis of this discovery.

Specifically, the present invention provides a propylene type resin composition comprising from 95.0 to 99.999 parts by weight of component (A) which is a propylene/$\alpha$-olefin random copolymer polymerized by a metallocene catalyst, and from 0.001 to 5.0 parts by weight of component (C) which is a polyethylene wax, wherein components (A) and (C) satisfy the following conditions:

Component (A): Propylene/$\alpha$-olefin random copolymer
 1) Melt index at 230° C.: 2 to 30 g/10 min
 2) Main melting pea% temperature (Tm) obtained by DSC: 110 to 145° C.

Component (C): Polyethylene wax
 1) Density: 0.94 to 0.98 g/cm$^3$
 2) Melt viscosity at 140° C.: At least 10 cps.

The present invention also provides a propylene type resin composition comprising from 50 to 98 parts by weight of component (A) which is a propylene/$\alpha$-olefin random copolymer polymerized by a metallocene catalyst, from 2 to 50 parts by weight of component (B) which is a propylene type elastomer or an ethylene type elastomer, and from 0.001 to 5.0 parts by weight of component (C) which is a polyethylene wax, wherein components (A), (B) and (C) satisfy the following conditions:

Component (A): Propylene/$\alpha$-olefin random copolymer
 1) Melt index at 230° C: 2 to 30 g/10 min
 2) Main melting peak temperature (Tm) obtained by DSC: 110 to 145° C.

Component (B): Elastomer (B-1) Propylene type elastomer

Propylene/$\alpha$-olefin copolymer satisfying the following 1) and 2):
 1) Content of units derived from propylene: 5 to 95 mol %
 2) Content of units derived from a $C_{4-20}$ $\alpha$-olefin: 5 to 95 mol %

(B-2) Ethylene type elastomer

Ethylene-$\alpha$-olefin copolymer satisfying the following 3) and 4)
 3) Content of units derived from ethylene: 5 to 95 mol %
 4) Content of units derived from an $\alpha$-olefin: 5 to 95 mol %

Component (C): Polyethylene wax
1) Density: 0.94 to 0.98 g/cm³
2) Melt viscosity at 140° C: At least 10 cps.

Further, the present invention provides such a propylene type resin composition, wherein the metallocene catalyst for component (A) is a compound of the following formula (1) or its partially hydrogenated product:

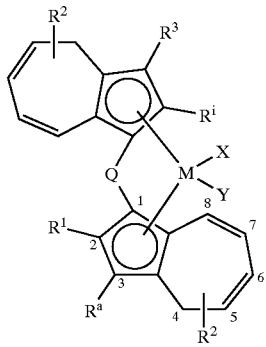

(1)

wherein Q is a linking group which links the two conjugated five-membered cyclic ligands, M is a metal atom selected from the group consisting of titanium, zirconium and hafnium, each of X and Y is a hydrogen atom, a halogen atom, a hydrocarbon groups an alkoxy group, an amino group, a nitrogen-containing hydrocarbon group, a phosphorus-containing hydrocarbon group or a silicon-containing hydrocarbon group, each of $R^1$ and $R^3$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group, and each $R^2$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group.

Still further, the present invention provides a propylene type resin film molded from such a propylene type resin composition by means of a T-die, and a laminated resin film containing at least one layer made of such a propylene type resin film.

Now, the present invention will be described in detail with reference to the preferred embodiments.

In the first aspect, the present invention provides a propylene type resin composition comprising a specific propylene/α-olefin random copolymer (component (A)) polymerized by a metallocene catalyst, and a polyethylene wax (component (C)). Here, comprising does not exclude addition of a third component useful for the purpose of the present invention in addition to the above two components.

In the second aspect, the present invention provides a propylene type resin composition comprising a specific propylene/α-olefin random copolymer (component (A)) polymerized by a metallocene catalyst, a propylene type elastomer or an ethylene type elastomer (component (B)) and a polyethylene wax (component (C)). Here, "comprising" does not exclude addition of a third component useful for the purpose of the present invention in addition to the above three components.

Component (A): Propylene/α-olefin Random Copolymer

The propylene/α-olefin random copolymer as component (A) of the present invention, comprises propylene as the main component and α-olefin units as a subsidiary component (comonomer units).

The α-olefin to be used as the comonomer includes ethylene, and usually, ethylene or a $C_{4-18}$ 1-olefin is employed. Specifically, ethylene, 1-butene, 1-pentene, 1-hexene, 1-octene, 1-heptene, 4-methyl-pentene-1,4-methyl-hexene-1, or 4,4-dimethylpentene-1, may, for example, be mentioned. It is preferably ethylene, 1-butene or 1-hexene, more preferably ethylene.

The proportion of propylene units in the copolymer is preferably at least 80 mol %, preferably from 85 to 99.5 mol %, more preferably from 90 to 99 mol % and the comonomer is at most 20 mol %, preferably from 15 to 0.5 mol %, more preferably from 10 to 1 mol %. As the comonomer, the above α-olefin is not limited to one type, and the copolymer may be a multi-component copolymer employing two or more α-olefins, such as a terpolymer.

As the copolymer of component (A), a propylene/α-olefin random copolymer satisfying the following conditions 1) and 2) is used. Further, it is preferred to use a propylene/α-olefin random copolymer which satisfies not only the conditions 1) and 2), but also the following condition (3).

1) Melt index ($MI_p$)

A propylene/α-olefin random copolymer is employed which has a melt index ($MI_p$) at 230° C. (2.16 kg) of from 2 to 30 g/10 min, preferably from 3 to 15 g/10 min, more preferably from 5 to 10 g/10 min. If the melt index is smaller than 2 g/10 min, the discharge property tends to be poor, and the T-die moldability tends to be poor. On the other hand, if it exceeds 30 g/10 min, the film strength tends to be low, such being undesirable.

2) Main melting peak temperature (Tm) obtained by DSC

As the propylene/α-olefin random copolymer, one having the main melting peak temperature (Tm) of from 110 to 145° C., preferably from 115 to 140° C. as obtained by DSC, is used. If the melting peak temperature (Tm) is lower than 110° C., even in an environment practically acceptable for a film, blocking of films to one another is likely to occur at a high temperature, such being undesirable. If it exceeds 145° C., the low temperature heat sealing property tends to be impaired, such being likewise undesirable.

3) A propylene type resin composition (component (A) and component (C)) is molded into films having a thickness of 25 μm by means of a T-die at cooling temperatures of 25° C. and 45° C., whereby the average surface roughnesses of their surfaces as measured by an atomic force microscope are represented by $[Ra(A+C)_{25}]$ and $[Ra(A+C)_{45}]$. Whereas, only component (A) is molded into films having a thickness of 25 μm by means of a T-die at cooling temperatures of 25° C. and 45° C., whereby the average surface roughnesses of their surfaces as measured by an atomic force microscope are represented by $[Ra(A)_{25}]$ and $[Ra(A)_{45}]$. Such surface roughnesses satisfy the following formulae (1), (2), (3) and (4):

$[Ra(A)_{45}]-[Ra(A)_{25}] \geq 10$   Formula (1)

$[Ra(A)_{45}] \geq 15$   Formula (2)

$[Ra(A+C)_{45}]-[Ra(A+C)_{25}] < 10$   Formula (3)

$[Ra(A+C)_{45}] < 15$   Formula (4)

the average surface roughnesses $[Ra(A+C)_{25}]$ and $[Ra(A+C)_{45}]$ of the film surfaces by the atomic force microscope, can be measured by using an atomic force microscope cyclic contact mode, and the average surface roughness Ra i.e. the degree of irregularities in the three dimensional direction can be quantitatively determined by calculation in accordance with the following formula (8):

$$Ra = \frac{1}{So} \int_{Y_T}^{Y_B} \int_{X_L}^{X_R} |F(X, Y) - Zo| dX dY \qquad \text{Formula (8)}$$

In the formula (8), F(X, Y) represents the measuring plane, So the measuring area, $Y_T$ to $Y_B$ the measuring range in Y direction, $X_L$ to $X_R$ the measuring range in X-direction, and Zo the reference plane. Zo is represented by the following formula (9):

$$Zo = \frac{1}{So} \int_{Y_T}^{Y_B} \int_{X_L}^{X_R} F(X, Y) dX dY \qquad \text{Formula (9)}$$

The propylene/α-olefin random copolymer in the present invention, can be produced by random polymerization of propylene with an α-olefin by means of a metallocene catalyst.

The metallocene catalyst may be any metallocene catalyst so long as the above polypropylene type resin can be obtained. However, usually, a Group 4 to 6 transition metal compound such as Zr, Ti or Hf, particularly a Group 4 transition metal compound, and an organic transition metal compound having a cyclopentadienyl group or a group of a cyclopentadienyl derivative, can be used.

The group of a cyclopentadienyl derivative may be an alkyl-substituted group of e.g. pentamethylcyclopentadienyl, or a group wherein two or more substituents are bonded to form a saturated or unsaturated cyclic substituent. Typically, an indenyl group, a fluorenyl group, an azulenyl group or their partially hydrogenated products may be mentioned.

Further, one wherein a plurality of cyclopentadienyl groups are bonded by e.g. an alkylene group, a silylene group or a germilene group, is preferred.

As a preferred metallocene catalyst for the production of the propylene type resin of the present invention, a transition metal compound of the following formula (1) may be employed.

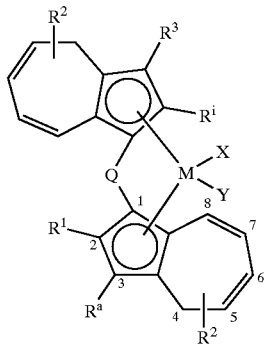

wherein Q is a linking group which links the two conjugated five-membered cyclic ligands, M is a metal atom selected from the group consisting of titanium, zirconium and hafnium, each of X and Y is a hydrogen atom, a halogen atom, a hydrocarbon group, an alkoxy group, an amino group, a nitrogen-containing hydrocarbon group, a phosphorus-containing hydrocarbon group or a silicon-containing hydrocarbon group, each of $R^1$ and $R^3$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group, and each $R^2$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group. Particularly preferably, $R^2$ represents a $C_{6-16}$ aryl group.

Q is a linking group which links the two conjugated five-membered cyclic ligands, and it may, for example, be (a) a $C_{1-20}$, preferably $C_{1-12}$, bivalent hydrocarbon group, (b) a silylene group or an oligo-silylene group, (c) a silylene or oligo-silylene group having a $C_{1-20}$, preferably $C_{1-12}$, hydrocarbon-group as a substituent, (d) a germilene group, or (e) a germilene group having a $C_{1-20}$ hydrocarbon group as a substituent. Among them, preferred is an alkylene group, or a silylene group having a hydrocarbon group as a substituent.

Each of X and Y which are independent of each other i.e. which may be the same or different, is (a) a hydrogen atom, (b) a halogen atom, (c) a $C_{1-20}$, preferably $C_{1-12}$, hydrocarbon group, or (d) a $C_{1-20}$, preferably $C_{1-12}$, hydrocarbon group containing oxygen, nitrogen or silicon.

Among them, preferred may, for example, be a hydrogen atom, a chlorine atom, a methyl group, an isobutyl group, a phenyl group, a dimethylamide group or a diethylamide group.

Each of $R^1$ and $R^3$ represents a $C_{1-20}$ hydrocarbon group, or a $C_{1-20}$ halogenated hydrocarbon group, a silicon-containing hydrocarbon group, a nitrogen-containing hydrocarbon group, an oxygen-containing hydrocarbon group, a boron-containing hydrocarbon group, or a phosphorus-containing hydrocarbon group. Specifically, a methyl group, an ethyl group, a propyl group, a butyl group, a hexyl group, an octyl group, a phenyl group, a naphthyl group, a butenyl group or a butadienyl group may, for example, be mentioned. Further, in addition to a hydrocarbon group, a methoxy group, an ethoxy group, a phenoxy group, a trimethylsilyl group, a diethylamino group, a diphenylamino group, a pyrazolyl group, an indolyl group, a dimethylphosphino group, a diphenylphosphino group, a diphenylboron group, or a dimethoxyboron group, which contains e.g. halogen, silicon, nitrogen, oxygen, boron or phosphorus, may he mentioned as a typical example. Among them, a hydrocarbon group is preferred, and methyl, ethyl, propyl or butyl is particularly preferred.

Each $R^2$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group. Among them, preferred is a $C_{6-16}$ aryl group. Specifically, phenyl, α-naphthyl, β-naphthyl, anthracenyl, phenanthryl, pyrenyl, acenaphthyl, phenalenyl or aceanthrenyl may, for example, be mentioned. Further, such an aryl group may be one substituted by a halogen atom, a $C_{1-20}$ hydrocarbon group, a $C_{1-20}$ halogenated hydrocarbon group, a nitrogen-containing hydrocarbon group, an oxygen-containing hydrocarbon groups a boron-containing hydrocarbon group or a phosphorus-containing hydrocarbon group. Among them, preferred is phenyl, naphthyl, halogenated phenyl or halogenated naphthyl.

M is a metal selected from the group consisting of titanium, zirconium and hafnium. Preferred is zirconium or hafnium.

Non-restrictive examples of the above transition metal compound include dimethylsilylenebis{1,1'-(2-methyl-4-phenyl-4H-azulenyl)}zirconium dichloride, dimethylsilylenebis[1,1'-{2-methyl-4-(4-chlorophenyl)-4H-azulenyl}]zirconium dichloride, dimethylsilylenebis[1,1'-{2-methyl-4-(4-chloro-2-naphthyl)-4H-azulenyl}] zirconium dichloride, dimethylgermilenebis{1,1'-(2methyl-4-phenyl-4H-azulenyl)}zirconium dichloride, dimethylgermilenebis[1,1'-{2-methyl-4-(4-chlorophenyl)-4H-azulenyl})]zirconium dichloride, and dimethylgermilenebis{1,1'-(2-ethyl-4-phenyl-4H-azulenyl)}zirconium dichloride.

Further, the hydrogenated product includes, for example, diphenylsilylenebis{1,1'-(2-methyl-4-phenylhexahydroazulenyl))zirconium dichloride, dimethylsilylenebis[1,1'-(2-methyl-4-(4-chlorophenyl) hexahydroazulenyl}]zirconium dichloride, dimethylsilylenebis[1,1'-{2-methyl-4-(4-chloro-2-naphthyl) hexahydroazulenyl}]zirconium dichloride, dimethylgermilenebis{1,1'-(2-methyl-4-phenylhexahydroazulenyl)}zirconium dichloride, dimethylgermilenebis[1,1'-{2-methyl-4-(4-chlorophenyl) hexahydroazulenyl}]zirconium dichloride, and dimethylgermilenebis[1,1'-{2-ethyl-4-(4-chlorophenyl) hexahydroazulenyl}]zirconium dichloride.

Further, compounds having one or both of dichloride of these compounds substituted by bromine, iodine, hydrogen, methylphenyl, benzyl, alkoxy, dimethylamide or diethylamide, may also be mentioned. Further, compounds having zirconium of the above compounds substituted by e.g. titanium or hafnium, may also be mentioned.

The co-catalyst is at least one compound selected from the group consisting of an aluminum-oxy compound, an ionic compound or Lewis acid capable of reacting with a metallocene compound to convert the metallocene compound component to a cation, a solid acid and a silicate in the form of an ion exchange layer. Further, an organic aluminum compound may be added together with these compounds, as the case requires.

(b-1) Aluminum-oxy compound

The aluminum-oxy compound may, for example, be a so-called alumoxane such as methyl alumoxane or methyl isobutyl alumoxane, or a reaction product of a trialkylaluminum with an alkyl borate.

The aluminum-oxy compound may be supported on a fine particulate carrier.

The fine particulate carrier may, for example, be a fine particulate carrier made of an inorganic or organic compound. As an inorganic carrier, silica, alumina, silica.alinmna, magnesium chloride, activated carbon or an inorganic silicate, may, for example, be mentioned. Or, it may be a mixture thereof.

As an organic carrier, a fine particulate carrier made of a porous polymer made of a polymer of a $C_{2-14}$ α-olefin such as ethylene, propylene, 1-butene, or 4-methyl-1-pentene, or a polymer of an aromatic unsaturated hydrocarbon such as styrene or divinyl benzene, may be mentioned. Or, it may be a mixture thereof.

(b-2) Ionic compound or Lewis acid capable of reacting with the catalyst component (A) to convert the catalyst component (A) to a cation The ionic compound capable of reacting with the catalyst component (A) to convert the catalyst component (A) to a cation may, for example, be a complex compound of a cation such as a carbonium cation or an ammonium cation with a cation of an organic boron compound such as triphenylboron, tris(3,5-difluorophenyl)boron or tris (pentafluorophenyl)boron.

As the Lewis acid, particularly as the Lewis acid capable of converting the catalyst component (A) to a cation, various organic boron compounds such as tris(pentafluorophenyl) boron, may, for example, be mentioned. Or, a metal halogenated compound such as aluminum chloride or magnesium chloride may, for example, be mentioned. Such a Lewis acid may be supported on a fine particulate carrier. The fine particulate carrier may be the one as described above.

(b-3) Solid acid

The solid acid may, for example, be alumina or silica-alumina.

(b-4) Ion exchangeable layered silicate

As component (b-4), an ion exchangeable layered silicate is employed. The ion exchangeable layered silicate is a silicate compound taking a crystal structure wherein faces constituted by e.g. ion bonding are laminated in parallel one on another with a weak bonding force, wherein the ions contained are exchangeable. Preferred examples of such an ion exchangeable layered silicate include a smectite family such as montmorillonite, sauconite, beidellite, nontronite, saponite, hectorite and stevensite, a vermiculite family such as vermiculite, and a mica family such as mica, illite, sericite and glauconite.

These silicates are preferably those subjected to chemical treatment. Here, the chemical treatment may be surface treatment to remove impurities attached to the surface or treatment to give influence over the crystal structure or the chemical composition of the layered silicates. Specifically, (a) acid treatment, (b) alkali treatment, (c) salt treatment or (d) an organic treatment may, for example, be mentioned. By such treatment, impurities on the surface are removed, cations between the layers are exchanged, cations such as Al, Fe or Mg in the crystal structure are eluted. Consequently, an ion complex, a molecule complex or an organic derivative is formed, whereby the surface area, the interlaminer distance or the solid acidity can be changed. These treatments may be carried out alone or in combination of two or more of them.

The polymerization method may, for example, be a slurry method employing an inorganic solvent in the presence of such a catalyst component, a gas phase method or a solution method employing substantially no solvent, or a bulk polymerization method using a monomer for polymerization as a solvent.

As a method to obtain the propylene α-olefin random copolymer specified by the present invention, for example, the polymerization temperature or the amount of the comonomer is adjusted to properly control the distributions of the molecular weight and the crystallinity, thereby to obtain a desired polymer.

Component (B): Elastomer

In the second aspect of the present invention, the following (B-1) propylene type elastomer and/or (B-2) ethylene type elastomer is added.

(B-1) Propylene type elastomer

Propylene/α-olefin copolymer satisfying the following 1) and 2):

1) Content of units derived from propylene: 5 to 95 mol %

2) Content of units derived from a $C_{4-20}$ α-olefin: 5 to 95 mol %

(B-2) Ethylene type elastomer

Ethylene/α-olefin copolymer satisfying the following 3) and 4)

3) Content of units derived from ethylene: 5 to 95 mol %

4) Content of units derived from a $C_{3-20}$ α-olefin: 5 to 95 mol %

In the present invention, the elastomer means a soft polymer material. Usually, the density is at most 0.900 g/cm$^3$, preferably within a range of from 0.860 to 0.900 g/cm$^3$, and the melt flow rate (MFR) at 190° C. under a load of 2.16 kg is usually within a range of from 0.01 to 100 g/10 min, preferably from 0.05 to 50 g/10 min. Such a propylene type elastomer and an ethylene type elastomer are amorphous, or the crystallinity as measured by an X-ray diffraction method is less than 30%.

As (B-1) the propylene type elastomer, a copolymer elastomer of propylene with a $C_{4-20}$ α-olefin, is employed. The content of units derived from propylene is usually from 5 to 95 mol %, preferably from 20 to 92 mol %, more preferably from 50 to 90 mol %, particularly preferably from 60 to 80 mol %. The content of units derived from the $C_{4-20}$ α-olefin is usually from 5 to 95 mol %, preferably from 8 to 80 mol %, more preferably from 10 to 50 mol %, particularly preferably from 20 to 40 mol %.

If the content of units derived from propylene is less than 5 mol % in the propylene type elastomer, the transparency tends to be low, such being undesirable. On the other hand, if the content of units derived from propylene exceeds 95 mol %, the effect to improve the low temperature heat sealing property tends to be low.

As (B-2) the ethylene type elastomer, a copolymer elastomer of ethylene with a $C_{3-20}$ α-olefin, is used. The content of units derived from ethylene is usually from 5 to 95 mol %, preferably from 20 to 92 mol %, more preferably from 50 to 90 mol %. The content of units derived from the $C_{3-20}$ α-olefin is usually from 5 to 95 mol %, preferably from 8 to 80 mol %, more preferably from 10 to 50 mol %.

If the content of units derived from ethylene is less than 5 mol % in the ethylene type elastomer, the effect to improve the low temperature heat sealing property tends to be inadequate. On the other hand, if the content of units derived from ethylene exceeds 95 mol %, the transparency tends to be low, such being undesirable.

The $C_{3-20}$ α-olefin may, for example, be propylene, 1-butene, 1-pentene, 1-hexene, 4-methyl-1-pentene, 1-octene, 1-decene or a mixture thereof. Among them, a $C_{3-10}$ α-olefin is preferred.

Further, in the present invention, in addition to propylene or ethylene and an α-olefin, component units other than component units derived from an α-olefin, such as component units derived from a vinyl compound or a diene compound, may be contained within a range not to impair the desired characteristics. As such component units, an aliphatic non-conjugated diene such as 1,4-hexadiene, 1,6-octadiene, 2-methyl-1,5-hexadiene, 6-methyl-1,5-heptadiene or 7-methyl-1,6-octadiene, a cyclic non-conjugated diene such as cyclohexadiene, dicyclopentadiene, methyltetrahydroindene, 5-vinyl norbornene, 5-ethylidene-2-norbornene, 5-methylene-2-norbornene, 5-isopropylidene-2-norbornene or 6-chloromethyl-5-propenyl-2-norbornene, a diene compound such as 2,3-isopropylidene-5-norbornene or 2-propenyl-2,2-norbornadiene, or styrene or vinyl acetate, may, for example, be mentioned.

Such third comonomers may be used alone or in combination. The content of such a third comonomer is usually at most 10%, preferably from 0 to 5%.

Component (C): Polyethylene Wax

In the present invention, the polyethylene wax used as component (C) is a polymer of —CH$_2$—, and it may be a polyethylene, a copolymer of ethylene with an α-olefin, or one having such a polyethylene or a copolymer modified by an acid to introduce polar groups. Its number average molecular weight is usually from 500 to 15,000, preferably from 1,000 to 10,000.

The polyethylene wax is produced by various methods. In the present invention, one produced by any method may be employed. For example, the polyethylene wax may be produced by a method of polymerizing ethylene. In such a case, there is a method of polymerizing at a high temperature under a high pressure by radical polymerization or a method of polymerizing under a low pressure by a Ziegler catalyst. Further, there is a method of reducing the molecular weight by thermal decomposition of a common polyethylene for molding, or a method of separating and utilizing a low molecular weight polyethylene produced as a by-product in the production of a common polyethylene for molding, or a method of oxidizing a common polyethylene for molding.

The polyethylene wax to be used in the present invention is required to satisfy the following conditions 1) and 2).

1) Density

The density is from 0.94 to 0.98 g/cm$^3$, preferably from 0.95 to 0.98. more preferably from 0.96 to 0.98, If it is higher than this range, the dispersed diameter of the polyethylene wax will not be sufficiently small, and the dispersed particles will bring about irregularities on the film surface, whereby the transparency tends to be low. On the other hand, if it is lower than the above range, the effect for improving the transparency tends to be small.

2) The melt viscosity at 140° C. is at least 10 cps, preferably from 15 to 30,000 cps.

If the melt viscosity is lower than 10 cps, the effect for improving the transparency tends to be small, such being undesirable.

In the present invention, a polyethylene wax, an acid-modified polyethylene wax or an oxidized polyethylene wax may be used alone. Otherwise, their mixture or a mixture thereof with a polypropylene wax, may be employed.

Blending

In the first aspect of the present invention, the propylene type resin composition comprises component (A) i.e. the propylene/α-olefin random copolymer and component (e) i.e. the polyethylene wax in such a blending ratio that component (A) is from 95.0 to 99.999 parts by weight, and component (C) is from 0.001 to 5.0 parts by weight, provided that the total amount of components (A) and (C) is 100 parts by weight. If component (C) is less than 0.001 part by weight, the effect to improve the transparency of the film tends to be inadequate. On the other hand, if it exceeds 5.0 parts by weight, the dispersed diameter of the polyethylene wax will not be sufficiently small, and dispersed particles will bring about irregularities on the film surface, whereby the transparency will be impaired.

In the second aspect of the present invention, the propylene type resin composition comprises component (A) i.e. the propylene/α-olefin random copolymer, component (B) i.e. the propylene type elastomer or the ethylene type elastomer, and component (C) i.e. the polyethylene wax in such a blending ratio that component (A) is from 50.0 to 98.0 parts by weight, preferably from 70.0 to 95.0 parts by weight, component (B) is from 2.0 to 50.0 parts by weight, preferably from 5.0 to 30.0 parts by weight, and component (C) is from 0.001 to 5.0 parts by weight, preferably from 0.01 to 3.0 parts by weight, provided that the total amount of components (A) (B) and (C) is 100 parts by weight. If component (B) is less than 2.0 parts by weight, the heat sealing property tends to be poor, and if it exceeds 50.0 parts by weight, the rigidity tends to be low. Further, if component (C) is less than 0.001 part by weight, the effect to improve the transparency of the film will be insufficient. On the other hand, if it exceeds 5.0 parts by weight, the polyethylene wax tends to form a continuous phase in the film, whereby the transparency of the film tends to be impaired.

The propylene type resins of the present invention having the above-mentioned characteristics, are excellent in transparency and excellent in anti-blocking properties. Accordingly, they are effective particularly when high transparency is required and addition of an anti-blocking agent is restricted. However, the present invention does not exclude addition of an anti-blocking agent, and an anti-blocking agent may be added also in the present invention depending upon the particular purpose.

As such an anti-blocking agent, an inorganic fine powder having an average particle size of from 1.0 to 7.0 µm and a pore volume of from 0.4 to 1.6 ml/g is preferred.

As a specific example of the anti-blocking agent, for example, as an inorganic type, synthetic or natural silica (silicon dioxide), magnesium silicate, alumino silicate, talc, zeolite, aluminum borate, calcium carbonate, calcium sulfate, barium sulfate or calcium phosphate, may be employed.

Further, as an organic type, polymethyl methacrylate, polymethylsilsesquioxane (silicone), polyamide, polytetrafluoroethylene, an epoxy resin, a polyester resin, a benzoguanamine/formaldehyde (a urea resin), or a phenol resin, may, for example, be employed. When the average particle diameter of such an anti-blocking agent is within the above range, it is possible to obtain a polypropylene film having good transparency and scratch resistance.

The anti-blocking agent is used preferably in an amount of from 0.01 to 0.7 parts by weight, more preferably from 0.05 to 0.5 part by weight, particularly preferably from 0.05 to 0.3 part by weight, per 100 parts by weight of the propylene type resin composition ((A)+(C) or (A)+(B)+(C)).

Further, the anti-blocking agent is preferably one having surface treatment applied. As a surface treating agent, a surfactant, a metal soap, an organic acid such as acrylic acid, oxalic acid, citric acid or tartaric acid, a higher alcohol, an ester, a silicone, a fluorine resin, a silane coupling agent, or a condensed phosphate such as sodium hexametaphosphate, sodium pyrophosphate, sodium tripolyphosphate or sodium trimetaphosphate, may, for example, be employed. Particularly preferred is one treated with citric acid among organic acid treatments.

The treatment method is not particularly limited, and a known method such as surface spraying or dipping may be employed. The anti-blocking agent may be in any form and may have an optional shape such as a spherical, angular, columnar, needle-like, plate-like or non-specific shape.

In the present invention, it is preferred to incorporate a lubricant. The lubricant may, for example, be a straight chain monocarboxylic acid monoamide compound or a straight chain monocarboxylic acid bisamide compound. One or more of such compounds may be used. The straight chain monocarboxylic acid monoamide compound may, for example, be oleic amide, stearic amide, erucic amide, palmitic amide, behenic amide or lauric amide.

The straight chain monocarboxylic acid bisamide compound may, for example, be ethylenebis oleic amide, ethylenebis stearic amide or methylene bisstearic amide.

The amount of the lubricant is preferably from 0.01 to 1.0 parts by weight, more preferably from 0.02 to 0.5 part by weight, particularly preferably from 0.04 to 0.25 part by weight, per 100 parts by weight of the propylene type resin composition ((A)+(C) or (A)+(B)+(C)).

Particularly preferred is an unsaturated fatty acid amide having a melting point of from 70 to 90° C. or a saturated fatty acid amide having a melting point of from 100 to 125° C., and it is especially preferred to use both of them in combination. The blending ratio of the unsaturated fatty acid amide to the saturated fatty acid amide (the unsaturated fatty acid amide/saturated fatty acid amide) is usually within a range of from 1/99 to 99/1, preferably 2/98 to 98/2, more preferably from 10/90 to 90/10, by weight ratio. By such a blend system, good performance can be obtained in a small amount of the lubricant as compared with a single system.

As the unsaturated fatty acid amide having a melting point within a range of from 70 to 90° C., a $C_{18-22}$ unsaturated fatty acid amide ray be employed. Specifically, one containing, as the main component, oleic amide, erucic amide, brassidic amide, elaidic amide, N-stearylerucic amide, lauric amide or N-(2-hydroxyethyl) lauric amide, may be mentioned. If the melting point of the unsaturated fatty acid amide is lower than 70° C., the lubricating property at a high temperature of at least 45° C. tends to deteriorate, such being undesirable. On the other hand, if the melting point exceeds 90° C., the effect obtainable in combination with the saturated fatty acid amide, tends to be small, such being undesirable.

As the saturated fatty acid amide having a melting point of from 100 to 125° C., a $C_{16-22}$ fatty acid amide or its derivative may be employed. Specifically, one containing, as the main component, stearic amide, palmitic amide, behenic amide, N-(2-hydroxymethyl).stearic amide, hexamethylenebis oleic amide, hexamethylenebis erucic amide or octamethylenebis erucic amide, may be mentioned. If the melting point of the saturated fatty acid amide is lower than 100° C., the initial lubricating property is good in many cases, but the lubricating effect at a high temperature of at least 45° C. tends to be low, such being undesirable. On the other hand, if the melting point exceeds 125° C., the initial lubricating property tends to be hardly obtainable, such being undesirable. The saturated fatty acid amide is more preferably a saturated fatty acid amide having a melting point of from 107 to 120° C., from the viewpoint of e.g. an antifouling property of the roll during the film formation.

Additional Components

The additional components may, for example, be compounding agents such as an antioxidant (of e.g. phenol type, phosphorus type or sulfur type), a photostabilizar, an ultraviolet absorber, a neutralizer, a lubricant (such as silicone oil), an antistatic agent, a fluidity-improving agent, a molecular weight controlling agent (a peroxide), an anti-blocking agent, an impact resistance improver, a defoaming agent, a dispersant, a metal-inactivating agent, an antibacterial agent, a fluorescent brightener, a coloring agent (an inorganic pigment such as titanium oxide, titanium yellow, zinc white, iron red or ultramarine blue, or an organic type pigment of e.g. condensed azo type, isoindolinone type, quinacridone type, perinone type, perylene type, quinophthalone type, anthraquinone type or phthalocyanine type), or resin or elastomer components other than those described above.

Mixing

In the first aspect of the present invention, to the propylene/α-olefin random copolymer of component (A) and the polyethylene wax of component (C), various compounding components are added, as the case requires, and firstly the mixture is mixed or melt-kneaded by a usual mixing or kneading machine such as a Henschel mixer, a super mixer, a V-blender, a tumbler mixer, a ribbon mixer, a Banbury mixer, a kneader blender or a single screw or twin screw extruder, and preferably melt-kneaded at a temperature of from 160 to 300° C., preferably at a temperature of from 180 to 280° C., followed by palletizing to obtain a molding material.

In the second aspect of the present invention, to the propylene/α-olefin random copolymer of component (A), the propylene type elastomer and/or the ethylene type elastomer of component (B) and the polyethylene wax of component (C), various compounding components are blended, as the case requires, and firstly, the mixture is mixed or melt-kneaded by a usual mixing or kneading machine, such as a Henschel mixer, a super mixer, a V-blender, a tumbler mixer, a ribbon mixer, a Banbury mixer, a kneader blender or a single screw or twin screw extruder, and preferably, melt-kneaded at a temperature of from 160 to 300° C., preferably from 180 to 280° C., followed by palletizing to obtain a molding material.

The propylene type resin compositions of the present invention provide films which have a small temperature dependency of the transparency and which are excellent in the transparency even when molded at a high speed.

Formation of Films

Preparation of films can be carried out by using the above-described propylene type resin compositions as the starting material resins. Specifically, sheets or films (non-stretched films) may be produced by a conventional method such as a casting method or an inflation method.

As the casting method for producing an extrusion molded product such as a sheet or a film (a non-stretched film), a resin melt-kneaded by an extruder is extruded from a T-die and cooled by being contacted with a roll having a cooling medium such as water circulated, whereby a film having good transparency and good thickness precision can usually be produced. Such a method is a method preferred for a film.

When the film of the present invention is formed and utilized as a single layer film, its thickness is usually from 5 to 500 μm, preferably from 10 to 200 μm. If the thickness is thinner than this range, processing tends to be difficult. On the other hand, if it is too thick, not only the processing tends to be difficult, but also a heat sealing property tends to be hardly obtainable.

Further, a stretched film may be produced by a conventional stretching apparatus from a sheet or film made of the propylene type resin composition of the present invention. Such a stretching apparatus may, for example, be a tentering machine, a simultaneous biaxial stretching machine or a monoaxial stretching machine. The stretching ratio of such a stretched film is preferably from 10 to 70 times in the case of a biaxially stretched film. In the case of a monoaxially stretched film, the stretching ratio is preferably from 2 to 10 times. Further, the thickness of the stretched film is usually preferably from 5 to 200 μm.

Characteristics of the Films

The films of the present invention are films made of the propylene type resin compositions, which have the characteristics of propylene type polymers, such as transparency, rigidity, impact resistance, etc. at least at an equal level thereto and which have an improved low temperature heat sealing property, which used to be a weak point of propylene type polymers.

Further, the films of the present invention may be used in the form of a composite film with other base material in order to further improve the excellent transparency, rigidity, impact resistance and heat sealing properties. Such a base material may be selected, for example, from an optional polymer capable of forming a film, a cellophane, paper, a fibrous structure and an aluminum foil.

The above-mentioned optional polymer capable of forming a film may be selected, for example, from a polyamide resin, a polyester resin, a polyolefin resin such as polyethylene, polypropylene, an ethylene/vinyl acetate copolymer or an ethylene/methacrylic acid copolymer, a polyvinyl chloride, a polyvinylidene chloride and a vinyl alcohol copolymer depending upon the purpose of the composite film and taking into consideration the respective transparency, rigidity, adhesiveness, printability or gas barrier properties.

When the base material is stretchable, it may be monoaxially or biaxially stretched. The composite film may be produced by a conventional technique such as a co-extrusion method, a dry lamination method, an extrusion lamination method or a combination thereof. In the case of the co-extrusion method, the dry lamination method or the extrusion lamination method, the thickness of the film of the present invention in the composite film structure is preferably from 0.5 to 200 μm.

The thickness of the film is not particularly limited, but it is usually from 0.5 to 200 μm, preferably from 1 to 150 μm, more preferably from 3 to 100 μm.

In the present invention, the polyethylene wax functions as crystal nuclei, whereby the crystallization temperature Tc obtained by DSC is higher than the polypropylene type resin itself as obtained by means of a metallocene catalyst. As the crystallization temperature is high, it is possible to prevent deterioration of the transparency due to the crystal growth, and it is possible to reduce the transfer of a roll mark due to insufficient heat removal which tends to be problematic during T-die molding at a high speed. Accordingly, the transparency of the polypropylene type resin film can be remarkably improved. Further, the polypropylene type resin obtained by means of a metallocene catalyst has a low molecular weight distribution, and one having the melting point lowered has a problem that the nip roll mark is likely to be transferred during the T-die film forming step. Whereas, by the addition of a small amount of the polyethylene wax, the crystallization temperature can be increased, and an improved effect with respect to the transfer of the roll mark can be obtained without impairing the low temperature heat sealing property.

Now, the present invention will be described in further detail with reference to Examples and Comparative Examples. However, it should be understood that the present invention is by no means restricted by such specific Examples.

Methods for Evaluating the Physical Properties

Evaluation methods employed in Examples and Comparative Examples are as identified in (1) to (10), and evaluation of physical properties of the films was carried out by methods (4) to (9) after heat treatment (aging) in an oven of 40° C. for 24 hours.

(1) Melt Index (MI)

Measured in accordance with JIS K6758 (condition: 230° C., load; 2.16 kgf) (unit: g/10 min).

(2) Melt Viscosity of Polyethylene Wax

The viscosity at 140° C. was measured in accordance with JIS Z8803 (method for measuring viscosity by a single cylindrical rotational viscometer).

(3) Melt Peak Temperature (Tm) and Crystallization Peak Temperature (Tc) by Means of Differential Scanning Calorimeter (DSC)

Using DSC manufactured by Seiko Company Limited, 5.0 mg of a sample was taken and maintained at 200° C. for 5 minutes. Then, it was crystallized at a temperature lowering speed of 10° C./min to 40° C. and further melted at a temperature raising speed of 10° C./min, whereby the crystallization peak temperature (Tc) and the melt peak temperature (Tm) were evaluated (units; ° C.).

(4) Density

The density of polyethylene wax was measured in accordance with JIS K6760.

(5) Transparency (Haze)

In accordance with ASTM-D1003, the obtained film was measured by a haze meter (unit: %). The smaller the value, the better the transparency.

(6) Blocking Property

A sample film of 2 cm (width)×15 cm (length) was taken from the obtained film, and the corona-treated surfaces to each other and the non-treated surfaces to each other were brought in contact (contact area 10 cm$^2$) over a length of 5 cm, respectively, and left under a load of 50 g/cm$^2$ in an atmosphere of a temperature of 40° C. for one day or 7 days, whereupon the load was removed, and they were thoroughly adjusted at a temperature of 23° C., whereupon the force required for shear peeling of each sample at a rate of 500 mm/min, was obtained by means of a tensile tester (Schopper type) (unit: g/10 cm$^2$). The smaller the value, the better the anti-blocking property.

(7) Lubricating Property (Slipping Property)

A sample obtained by adjusting the obtained film in an atmosphere of 23° C. for one day, and a sample obtained by adjusting the film in an atmosphere of a temperature of 40° C. for 7 days, were respectively, evaluated by the coefficients of static friction in accordance with ASTM-D1894 by measuring the frictions between the corona-treated surfaces and between the non-treated surfaces, of the sample films. The smaller the value, the better the slipping property (8) Heat Sealing Property (HS Temperature)

Using a heat seal bar of 5 mm×200 mm, non-treated surfaces of the obtained films were sealed under a heat sealing pressure of 2 kg/cm$^2$ for a heat sealing time of 1 second in a direction perpendicular to the melt extrusion direction (MD), and from the sealed sample, a test sample having a width of 15 mm was taken and peeled in the MD direction at a tensile speed of 500 mm/min by means of a Schopper type tester, whereby the load was read out. The heat sealing property was evaluated by the sealing temperature at which the load was 300 g (unit: ° C.). The smaller the value, the better the heat sealing property.

(9) Measurement of the Average Surface Roughness of the Films by an Atomic Force Microscope On SPI3700 (SPA300 units) manufactured by Seiko Electron Industry Company Limited, cantilever (probe) DF-40 was mounted, and irregularities were measured by a cyclic contact mode within a range of 20 μm×20 μm, whereupon by the data treating soft attached to the same apparatus, the average surface roughness (Ra) was calculated.

(10) Tensile Break Strength

A dumbbell test specimen was sampled from the obtained film in accordance with JIS K6781, and the tensile break strength was obtained in accordance with JIS K6781 (tensile speed: 500 mm/min, length of specimen between grips: 80 mm, and gage length; 40 mm).

(11) Extrusion Load

The resin pressure at the time of molding the film was measured. The higher the resin pressure, the larger the extrusion load, and the poorer the extrudability.

Preparation of Metallocene Catalyst (1) Preparation of Racemic Modification of dimethylsilylenebis[1,1'-{2-methyl-4-(4-chlorophenyl)-4H-azulenyl}]zirconium dichloride (a) Preparation of raceme.meso mixture: 11.7 ml (19.2 mmol) of a pentane solution of t-butyl lithium (1.64 M) was dropwise added at −78° C. to a solution of 1.84 g (9.6 mmol) of 1-bromo-4-chlorobenzene in n-hexane (10 ml) and diethyl ether (10 ml)).

The obtained solution was stirred at −5° C. for 1.5 hours. Then, to this solution, 1.2 g (8.6 mmol) of 2-methylazulene was added, and a reaction was carried out. While gradually returning this reaction solution to room temperature, it was stirred for 1.5 hours. Thereafter, the reaction solution was cooled to 0° C., and 15 μl (0.19 mmol) of 1-methylimidazole was added, and further, 0.52 ml (4.3 mmol) of dichlorodimethylsilane was added. The reaction solution was stirred at room temperature for 1.5 hours, and then dilute hydrochloric acid was added to terminate the reaction. After the liquid separation, the organic phase was concentrated under reduced pressure, and dichloromethane was added, followed by drying over magnesium sulfate The solvent was distilled off under reduced pressure, followed by purification by silica gel column chromatography to obtain 2.1 g of an amorphous solid.

Then, 1.27 g of the above reaction product was dissolved in 15 ml of diethyl ether, and 2.8 ml (4.5 mmol) of a n-hexane solution of n-butyllithium (1.66 M) was dropwise added thereto at −78° C. After the dropwise addition, while gradually returning the reaction solution to room temperature, it was stirred for 12 hours. The solvent was distilled off under reduced pressure. Then, 5 ml of a solvent mixture of toluene and diethyl ether (40:1) was added, followed by cooling to −78° C. 0.53 g (2.3 mmol) of zirconium tetrachloride was added thereto. Thereafter, the mixture was immediately returned to room temperature, and stirred at room temperature for 4 hours to carry out the reaction. The obtained reaction solution was subjected to filtration on celite, and the solid separated by filtration was recovered by washing with 3 ml of toluene. The recovered solid was extracted with dichloromethane, and the solvent was distilled off from the extracted solution to obtain 906 mg (yield: 56%) of raceme.meso mixture of dimethylsilylenebis [1,1'-{2-methyl-4-(4-chlorophenyl)-4H-azulenyl}] zirconium dichloride.

(b) Purification of Racemic Modification

Further, 900 mg of the above racene.meso mixture was dissolved in 20 ml of dichloromethane, and a high pressure mercury lamp of 100 W was irradiated for 40 minutes to increase the proportion of the racemic modification. Thereafter, the insolubles were filtered off, and the recovered filtrate was concentrated and evaporated to dryness. Then, the obtained solid component was stirred together with 22 ml of toluene and left to stand, whereupon the supernatant was removed. Such as purification operation was repeated four times, and the remaining solid component was dried to obtain 275 mg of a racemic modification of dimethylsilylenebis[1,1'-(2-methyl-4-(4-chlorophenyl)-4H-azulenyl)]zirconium dichloride.

(2) Preparation of Chemically Treated Clay 218.1 g of sulfuric acid (96%) and 130.4 g of magnesium sulfate were mixed with 909 ml of deionized water. To the obtained aqueous solution, 200.03 g of commercially available montmorillonite (Kunipia F (η=クニピア F), manufactured by Kunimine Kogyo K.K.) was dispersed and stirred at 100° C. for 2 hours. The aqueous slurry of this montmorillonite was adjusted to a solid content concentration of 12%, and subjected to spray granulation by a spray dryer to obtain particles. Then, the particles were dried under reduced pressure at 200° C. for 2 hours.

(3) Preparation of Solid Catalyst Component

The interior of the agitation type autoclave having an internal capacity of 1 l, was thoroughly flushed with propylene, and then 230 ml of dehydrated and deoxidized heptane was introduced, and the internal temperature was maintained at 40° C. 10 g of a chemically treated clay slurried with toluene, was added thereto. Further, 0.15 mmol of the racemic modification of dimethylsilylenebis[1,1'-{2-methyl-4-(4-chlorophenyl)-4H-azulenyl}]zirconium dichloride and 1.5 mmol of triisobutylaluminum mixed in the presence of toluene in a separate container, were added.

Here, propylene was introduced at a rate of 10 g/hr for 120 minutes. Thereafter, polymerization was continued for 120 minutes. Further, in a nitrogen atmosphere, the solvent was removed, followed by drying to obtain a solid catalyst component. This solid catalyst component contained polypropylene in an amount of 1.9 g per g of the solid component.

Polymerization 1

The interior of an agitation type autoclave having an internal capacity of 200 l, was thoroughly flushed with propylene, and then, 45 kg of thoroughly dehydrated liquefied propylene was introduced, 500 ml (0.12 mol) of a triisobutyl aluminum/n-heptane solution, 2.25 kg of ethylene, and 8.0 NL of hydrogen, were added thereto, and the internal temperature was maintained at 30° C.

Then, 1.2 g of the above solid catalyst component (as the solid component excluding the polypropylene) was injected with argon to initiate the polymerization, and the temperature was raised to 70° C. over a period of 30 minutes, and the temperature was maintained for 1 hour. Here, 100 ml of ethanol was added to terminate the reaction. The remaining gas was purged to obtain 21 kg of a propylene/ethylene copolymer A1 having a MI of 7.2 g/10 min, a Tm of 124.3° C., a Tc of 88.5° C. and an ethylene content of 3.7 wt %.

Polymerization 2

The interior of an agitation type autoclave having an internal capacity of 200 l, was thoroughly flushed with propylene, and then 45 kg of thoroughly dehydrated liquefied propylene was introduced. 500 ml (0.12 mol) of a triisobutyl aluminum.n-heptane solution, 2.25 kg of ethylene and 2.5 NL of hydrogen were added thereto, and the internal temperature was maintained at 30° C.

Then, 1.5 g of the above solid catalyst component (as the solid component excluding the polypropylene) was injected with argon to initiate the polymerization, and the temperature was raised to 70° C. over a period of 30 minutes, and then the temperature was maintained for 1 hour. Here, 100 ml of ethanol was added to terminate the reaction. The remaining gas was purged to obtain 18 kg of a propylene/ethylene copolymer A2 having a MI of 1.5 g/10 min, a Tm of 124.9° C., a Tc of 88.9° C., and an ethylene content of 3.7 wt %, Polymerization 3

The interior of an agitation type autoclave having an internal capacity of 200 l was thoroughly flushed with propylene, and then 45 kg of thoroughly dehydrated liquefied propylene was introduced. 500 ml (0.12 mol) of a triisobutyl aluminum.n-heptane solution, 2.25 kg of ethylene and 14 NL of hydrogen were added thereto, and the internal temperature was maintained at 30° C.

Then, 0.8 g of the above solid catalyst component (as the solid component excluding the polypropylene) was injected with argon to initiate the polymerization, and the temperature was raised to 70° C. over a period of 30 minutes, and the temperature was maintained for 1 hour. 100 ml of ethanol was added thereto to terminate the reaction. The remaining gas was purged to obtain 23 kg of a propylene/ethylene copolymer A3 having a MI of 35 g/10 min, a Tm of 125.3° C., a Tc of 89.4° C. and an ethylene content of 3.6 wt %.

Polymerization 4

The interior of an agitation type autoclave having an internal capacity of 200 l, was thoroughly flushed with propylene, Then, 45 g of thoroughly dehydrated liquefied propylene was introduced. 500 ml (0.12 mol) of a triisobutyl aluminum.n-heptane solution, 0.27 kg of ethylene and 0.5 NL of hydrogen were added thereto, and the internal temperature was maintained at 30° C.

Then, 2.7 g of the above solid catalyst component (as the solid component excluding the polypropylene) was injected with argon to initiate the polymerization, and the temperature was raised to 70° C. over a period of 30 minutes, and the temperature was maintained for 1 hour. Here, 100 ml of ethanol was added to terminate the reaction. The remaining gas was purged to obtain 16 kg of a propylene/ethylene copolymer A4 having a MI of 7.0 g/10 min, a Tm of 146.0° C., a Tc of 110.3° C., and an ethylene content of 0.5 wt %.

TABLE 1

|  | MI (g/10 min) | Tm (° C.) | Tc (° C.) | Ethylene content (wt %) |
| --- | --- | --- | --- | --- |
| Copolymer A1 | 7.2 | 124.3 | 88.5 | 3.7 |
| Copolymer A2 | 1.5 | 124.9 | 88.9 | 3.7 |
| Copolymer A3 | 35 | 125.3 | 89.4 | 3.6 |
| Copolymer A4 | 7.0 | 146.0 | 110.3 | 0.5 |

EXAMPLE 1

To 100 parts by weight of a propylene type resin composition prepared by adding 0.3 part by weight of a polyethylene wax (Mitsui Hiwax 400P, viscosity at 140° C.: 650 cps) to 99.7 parts by weight of the propylene/ethylene random copolymer (Copolymer A1) obtained by the above described method, 0.05 part by weight of Irganox 1010 (tetrakis[methylene-3-(3',5'-di-t-butyl-4-hydroxyphenyl) propionate]methane) and 0.05 part by weight of Irgaphos 168 (tris-(2,4-di-t-butylphenyl)phosphite), as antioxidants, and 0.05 part by weight of calcium stearate as a neutralizing agent, were added, and the mixture thereby obtained was mixed at a high speed of 750 rpm for one minute at room temperature by a Henschel mixer and then melted and kneaded at 230° C. by a twin screw extruder (Ikegai PCM 30), followed by cooling and cutting to obtain a pelletized resin composition.

Using this resin composition as a feed material and using a T-die method film-forming apparatus equipped with an extruder having an aperture of 35 mm in diameter, a T-die having a width of 300 mm, an air knife and a cooling roll, molding was carried at an extruded resin temperature of 230° C. at three levels of the cooling roll temperature of 25° C., 35° C. and 45° C. at a film take-up speed of 21 m/min to obtain non-stretched films having a thickness of 25 μm. The physical properties were evaluated, and the results were as shown in Table 2.

EXAMPLE 2

Using a propylene type resin composition prepared by adding 1.0 part by weight of a polyethylene wax (Mitsui Hiwax 400P, viscosity at 140° C.: 650 cps) to 99.0 parts by weight of the same propylene/ethylene random copolymer as in Example 1, the same test as in Example 1 was carried out. The results were as shown in Table 2.

EXAMPLE 3

Using a propylene type resin composition prepared by adding 0.3 part by weight of a polyethylene wax (Mitsui Hiwax 800P, viscosity at 140° C.: 8,000 cps) to 99.7 parts by weight of the same propylene/ethylene random copolymer as in Example 1, the same test as in Example 1 was carried out. The results were as shown in Table 2.

EXAMPLE 4

Using a propylene type resin composition prepared by adding 1.0 part by weight of a polyethylene wax (Sanyo Sanwax LEL800, viscosity at 140° C.: 22,000 cps) to 99.0 parts by weight of the same propylene/ethylene random copolymer as in Example 1, the same test as in Example 1 was carried out. The results were as shown in Table 2.

Comparative Example 1

Using the same propylene/ethylene random copolymer as in Example 1, the same test as in Example 1 was carried out except that no polyethylene wax was added. The physical properties were evaluated, and the results were as shown in Table 3. As compared with one having the polyethylene wax added, the transparency tended to deteriorate if cooling was not sufficient.

Comparative Example 2

Using a propylene type resin composition prepared by adding 10 parts by weight of a polyethylene wax (Sanyo Sanwax LEL800) to 90 parts by weight of the propylene/ethylene random copolymer (Copolymer A1) obtained in Polymerization 1, the same test as in Example 1 was carried out. The results were as shown in Table 3. The transparency was poor.

Comparative Example 3

Using a propylene type resin composition prepared by adding 1.0 part by weight of a polyethylene wax (Mitsui Hiwax 400P, viscosity at 140° C.: 650 cps) to 99.0 parts by weight of the propylene/ethylene random copolymer A2, the same test as in Example 1 was carried out. The results were as shown in Table 3. The resin pressure was high, and the extrudability (filming property) tended to deteriorate.

Comparative Example 4

Using a propylene type resin composition prepared by adding 1.0 part by weight of a polyethylene wax (Mitsui Hiwax 400P, viscosity at 140° C.: 650 cps) to 99.0 parts by weight of the propylene/ethylene random copolymer A3, the same test as in Example 1 was carried out. The results were as shown in Table 3. The tensile break strength decreased.

Comparative Example 5

Using a propylene type resin composition prepared by adding 1.0 part by weight of a polyethylene wax (Mitsui Hiwax 400P, viscosity at 140° C.; 650 cps) to 99.0 parts by weight of the propylene/ethylene random copolymer A4, the same test as in Example 1 was carried out. The results were as shown in Table 3. The heat sealing temperature was high and the low temperature heat sealing property was poor.

Comparative Example 6

Using a propylene type resin composition prepared by adding 1.0 part by weight of a polyethylene wax (Mitsui Hiwax 720P, viscosity at 140° C.: 6,000 cps) to 99.0 parts by weight of the propylene/ethylene random copolymer A1. the same test as in Example 1 was carried out. The results were as shown in Table 3. The transparency deteriorated.

EXAMPLES 5 to 10

To 100 parts by weight of the propylene type resin composition shown in Example 1, 3 or 4, 0.05 part by weight of Irganox 1010 (tetrakis[methylene-3-(3',5'-di-t-butyl-4-hydroxyphenyl)propionate]methane) and 0.05 part by weight of Irgaphos 168 (tris-(2,4-di-t-butylphenyl) phosphite), as antioxidants, 0.05 part by weight of calcium stearate as a neutralizing agent, synthetic silica or magnesium silicate as an anti-blocking agent as shown in Table 4, erucic amide (EA) as lubricant [A], and behenic amide (BA) as lubricant [B] were added, and the mixture was mixed at a high speed of 750 rpm for one minute at room temperature by a Henschel mixer, then melted and kneaded at 230° C. by a twin screw extruder (Ikegai PCM30 ), followed by cooling and cutting to obtain a pelletized resin composition.

Using this resin composition as a feed material, and using a T-die method film forming apparatus equipped with an extruder having an aperture of 35 mm in diameter, a T-die having a width of 300 mm, an air knife and a cooling roll, molding was carried out at an extruded resin temperature of 230° C., at two levels of the cooling roll temperature of 35° C. and 45° C., at a film take-up speed of 21 m/min to obtain non-stretched films having a thickness of 25 $\mu$m having corona treatment of 40 dyne/cm applied on one side. Evaluation of the physical properties was carried out by means of films molded at 35° C. and 45° C. for haze and one molded at 35° C. for other physical properties. The results were as shown in Table 4.

Comparative Example 7

The same test as in Example 6 was carried out except that the propylene type resin composition of comparative Example 1 was used in Example 6. The results were as shown in Table 5. As compared with one having the polyethylenes wax added, the transparency was poor.

EXAMPLES 11 and 12

The propylene type resin film (a single layer film obtained by applying corona treatment of 40 dyne/cm on one side) obtained in Example 6 or 10 was subjected to aging in an atmosphere at 40° C. for two days. Then, using a biaxially oriented polypropylene film of 40 $\mu$m as a base material film, a urethane type two-pack reactive adhesive was coated and then dry laminate was applied on the corona charge treated surface of the single layer film, whereupon the slipping property, the blocking property and the heat sealing property were measured. The results were as shown in Table 6.

EXAMPLES 13 to 17

To 100 parts by weight of the propylene type resin composition shown in Example 1, 3 or 4, 0.05 part by weight of Irganox 1010 (tetrakis[methylene-3-(3',5'-di-t-butyl-4-hydroxyphenyl)propionate]methane) and 0.05 part by weight of Irgaphos 168 (tris-(2,4-di-t-butylphenyl) phosphite), as antioxidants, 0.05 part by weight of calcium stearate as a neutralizing agent, synthetic silica or magnesium silicate as an anti-blocking agent as shown in Table 7, erucic amide (EA) as lubricant [A], and behenic amide (BA) as lubricant [B] were added, and the mixture was; mixed at a high speed of 750 rpm for one minute at room temperature by a Henschel mixer, and then melted and kneaded at 230° C. by a twin screw extruder (Ikegai PCM30), followed by cooling and cutting to obtain a pelletized resin composition.

Using this resin composition for a sealing layer, a homopolypropylene (FB3GT, trade name, manufactured by Japan Polychem Corporation) having a melting point of 163° C. and a MFR (230° C.) of 7.0 g/10 min for an interlayer and a random polypropylene (FW3E, trade name, manufactured by Japan Polychem Corporation) having a melting point of 140° C. and a MFR (230° C.) of 7.0 g/10 min for a front layer, and using a three layer T-die method film forming apparatus equipped with three separate extruders for the respective three layers (front layer/interlayer/seal=extruders having an aperture of 20 mm in diameter/35 mm in diameter/20 mm in diameter) and three layer T-die having a width of 300 mm communicated thereto, an air knife and a cooling roll, melt three layer coextrusion was carried out so that the front layer/interlayer/seal layer would be 1/4/1 as shown in Table 7, to obtain a non-stretched film. The physical properties were evaluated, and the results were as shown in Table 7. The lubricating property, the blocking property and the heat sealing property were evaluated only with respect to the sealing side surfaces.

TABLE 2

| | | | | Example | | | |
|---|---|---|---|---|---|---|---|
| | | | | 1 | 2 | 3 | 4 |
| Component (A) | Copolymer A1 | Amount | Parts by weight | 99.7 | 99.0 | 99.7 | 99.0 |
| | | $MI_p$ | g/10 min | 7.2 | 7.2 | 7.2 | 7.2 |
| | | Tm | ° C. | 124.3 | 124.3 | 124.3 | 124.3 |
| | | Tc | ° C. | 88.5 | 88.5 | 88.5 | 88.5 |
| Component (B) | PE wax | Type | | Mitsui Hiwax 400P | Mitsui Hiwax 400P | Mitsui Hiwax 800P | Sanyo Sanwax LEL800 |
| | | Amount | Parts by weight | 0.3 | 1.0 | 0.3 | 1.0 |
| | | Viscosity | cps | 650 | 650 | 8000 | 22000 |
| | | Density | g/cm$^3$ | 0.98 | 0.98 | 0.97 | 0.96 |
| Composition | | Tm | ° C. | 126.1 | 126.5 | 125.9 | 126.8 |
| | | Tc | ° C. | 92.9 | 92.9 | 92.3 | 94.4 |
| Physical properties | HAZE | 25° C. | % | 0.3 | 0.3 | 0.4 | 0.2 |
| | | 35° C. | % | 0.7 | 0.5 | 0.7 | 0.4 |
| | | 45° C. | % | 1.0 | 0.9 | 0.9 | 0.6 |
| | Average surface roughness | Ra (A) 25 | nm | 4.0 | 4.0 | 4.0 | 4.0 |
| | | Ra (A) 45 | nm | 18.0 | 18.0 | 18.0 | 18.0 |
| | | Ra (A) 45 − Ra (A) 25 | | 14.0 | 14.0 | 14.0 | 14.0 |
| | | Ra (A + C) 25 | nm | 4.6 | 6.3 | 4.5 | 5.1 |
| | | Ra (A + C) 45 | nm | 12.9 | 10.5 | 11.0 | 10.0 |
| | | Ra (A + C) 45 − Ra (A + C) 25 | | 8.3 | 4.2 | 6.5 | 4.9 |
| | HS temp. | | ° C./300 g | 118.0 | 118.3 | 118.1 | 118.0 |
| | Tensile break strength | | kg/cm$^2$ | 550 | 570 | 560 | 580 |
| | Extension load (resin pressure) | | kg/cm$^2$ | 190 | 190 | 191 | 192 |

TABLE 3

| | | | | Comparative Example | |
|---|---|---|---|---|---|
| | | | | 1 | 2 |
| Component (A) | Copolymer A1 | Amount | Parts by weight | 100 | 90.0 |
| | | $Mi_p$ | g/10 min | 7.2 | 7.2 |
| | | Tm | ° C. | 124.3 | 124.3 |
| | | Tc | ° C. | 88.5 | 88.5 |
| Component (C) | PE wax | Type | | Nil | Sanyo Sanwax LEL800 |
| | | Amount | Parts by weight | — | 10.0 |
| | | Viscosity | cps | — | 22000 |
| | | Density | g/cm$^3$ | — | 0.96 |
| Composition | | Tm | ° C. | 125.2 | 127.2 |
| | | Tc | ° C. | 89.7 | 99.0 |
| Physical properties | HAZE | 25° C. | % | 0.3 | 1.2 |
| | | 35° C. | % | 2.2 | 1.8 |
| | | 45° C. | % | 4.5 | 2.3 |
| | Average surface roughness | Ra(A)25 | nm | 4.0 | 4.0 |
| | | Ra(A)45 | nm | 18.0 | 18.0 |
| | | Ra(A)45-Ra(A)25 | | 14.0 | 14.0 |
| | | Ra(A + C)25 | nm | — | 15.0 |
| | | Ra(A + C)45 | nm | — | 17.5 |
| | | Ra(A + C)45-Ra(A + C)25 | | — | 2.5 |
| | HS temp. | | ° C./300 g | 118.1 | 118.7 |
| | Tensile break strength | | kg/cm$^2$ | 510 | 600 |
| | Extension load (resin pressure) | | kg/cm$^2$ | 190 | 195 |

TABLE 3-continued

|  |  |  |  | Comparative Example | | | |
|---|---|---|---|---|---|---|---|
|  |  |  |  | 3 | 4 | 5 | 6 |
| Component (A) | Copolymer A1, A2, A3, A4 | Amount | Parts by weight | 99.0 | 99.0 | 99.0 | 99.0 |
|  |  | $MI_p$ | g/10 min | 1.5 | 35 | 7.0 | 7.2 |
|  |  | Tm | °C. | 124.9 | 125.3 | 146.0 | 124.3 |
|  |  | Tc | °C. | 88.9 | 89.4 | 110.3 | 88.5 |
| Component (C) | PE wax | Type |  | Mitsui Hiwax 400P | Mitsui Hiwax 400P | Mitsui Hiwax 400P | Mitsui Hiwax 720P |
|  |  | Amount | Parts by weight | 1.0 | 1.0 | 1.0 | 1.0 |
|  |  | Viscosity | cps | 650 | 650 | 650 | 6000 |
|  |  | Density | g/cm³ | 0.98 | 0.98 | 0.98 | 0.92 |
| Composition |  | Tm | °C. | 126.9 | 125.9 | 147.2 | 124.3 |
|  |  | Tc | °C. | 93.1 | 93.2 | 113.1 | 88.8 |
| Physical properties | HAZE | 25° C. | % | 0.5 | 0.3 | 0.4 | 0.3 |
|  |  | 35° C. | % | 2.0 | 0.9 | 0.8 | 1.9 |
|  |  | 45° C. | % | 2.3 | 1.3 | 1.2 | 4.3 |
|  | Average surface roughness | Ra(A)25 | nm | 6.0 | 4.0 | 4.0 | 4.0 |
|  |  | Ra(A)45 | nm | 22.3 | 17.0 | 18.2 | 18.0 |
|  |  | Ra(A)45-Ra(A)25 |  | 16.3 | 13.0 | 14.2 | 14.0 |
|  |  | Ra(A + C)25 | nm | 6.2 | 3.8 | 4.0 | 4.0 |
|  |  | Ra(A + C)45 | nm | 16.0 | 13.2 | 13.0 | 20.1 |
|  |  | Ra(A + C)45-Ra(A + C)25 |  | 9.8 | 9.4 | 9.0 | 16.1 |
|  | HS temp. |  | °C./300 g | 120.0 | 119.0 | 142.0 | 118.0 |
|  | Tensile break strength |  | kg/cm² | 590 | 440 | 640 | 500 |
|  | Extension load (resin pressure) |  | kg/cm² | 240 | 190 | 205 | 190 |

TABLE 4

|  |  |  | Example | | | | | |
|---|---|---|---|---|---|---|---|---|
|  |  |  | 5 | 6 | 7 | 8 | 9 | 10 |
| Sample used |  |  | Example 1 | Example 1 | Example 1 | Example 1 | Example 3 | Example 4 |
| Anti-blocking agent | Type |  | Synthetic silica | Synthetic silica | Synthetic silica | Magnesium silicate | Synthetic silica | Synthetic silica |
|  | Treatment |  | Nil | Citric acid | Citric acid | Nil | Citric acid | Citric acid |
|  | Average particle size | μm | 2.7 | 2.7 | 2.7 | 3.0 | 2.7 | 2.7 |
|  | Pore volume | ml/g | 0.8 | 1.0 | 1.0 | 0.7 | 1.0 | 1.0 |
|  | Concentration | Parts by weight | 0.15 | 0.15 | 0.15 | 0.15 | 0.15 | 0.15 |
| Lubricant [A] | Type |  | EA | EA | Nil | EA | EA | EA |
|  | Concentration | Parts by weight | 0.04 | 0.04 | — | 0.04 | 0.04 | 0.04 |
| Lubricant [B] | Type |  | BA | BA | BA | BA | BA | BA |
|  | Concentration | Parts by weight | 0.08 | 0.08 | 0.08 | 0.08 | 0.08 | 0.08 |
| HAZE | 35° C. | % | 2.7 | 2.2 | 2.2 | 2.6 | 2.1 | 2.0 |
|  | 45° C. |  | 2.8 | 2.3 | 2.3 | 2.7 | 2.3 | 2.1 |
| Slipping property | 23° C.-1 day *1 |  | 0.60/0.55 | 0.54/0.50 | 0.60/0.54 | 0.53/0.48 | 0.50/0.49 | 0.53/0.49 |
|  | 40° C.-7 days *1 |  | 0.21/0.19 | 0.12/0.10 | 0.18/0.15 | 0.13/0.11 | 0.12/0.10 | 0.13/0.12 |
| Blocking property | 40° C.-1 day *1 | g/10 cm² | 250/200 | 200/150 | 250/200 | 250/200 | 250/150 | 250/200 |
|  | 40° C.-7 days *1 |  | 100/50 | 50/0 | 100/50 | 100/50 | 50/0 | 100/50 |
| HS temp. |  | °C./300 g | 118.2 | 118.4 | 118.3 | 118.3 | 119.0 | 118.7 |

*1: Treated surfaces to each other/non-treated surfaces to each other

TABLE 5

|  |  |  | Comparative Example 7 |
|---|---|---|---|
| Sample used |  |  | Comparative Example 1 |
| Anti-blocking agent | Type |  | Synthetic silica |
|  | Treatment |  | Organic substance |
|  | Average particle size | μm | 2.7 |
|  | Pore volume | ml/g | 1.0 |
|  | Concentration | Parts by weight | 0.15 |
| Lubricant [A] | Type |  | EA |
|  | Concentration | Parts by weight | 0.04 |
| Lubricant [B] | Type |  | BA |
|  | Concentration | Parts by weight | 0.08 |

TABLE 5-continued

|  |  |  | Comparative Example 7 |
|---|---|---|---|
| HAZE | 35° C. | % | 2.8 |
|  | 45° C. |  | 5.0 |
| Slipping property | 23° C.-1 day *1 |  | 0.58/0.56 |
|  | 40° C.-7 days *1 |  | 0.20/0.17 |
| Blocking property | 40° C.-1 day *1 | g/10 cm² | 250/200 |
|  | 40° C.-7 days *1 |  | 50/0 |
| HS temp. |  | °C./300 g | 118.3 |

*1: Treated surfaces to each other/non-treated surfaces to each other

TABLE 6

|  |  |  | Example 11 | Example 12 |
|---|---|---|---|---|
| Sample used |  |  | OPP/Example 6 | OPP/Example 10 |
| Slipping property | 45° C.-6 days | Non-treated surface/Non-treated surface | 0.13 | 0.12 |
| Blocking property | 45° C.-6 days | Non-Treated surface/Non-treated surface g/10 cm² | 50 | 50 |
| HS property |  | °C./300 g | 118.2 | 118.2 |

TABLE 7

| Material constitution | Layer ratio |  |  |  | Example 13 | Example 14 | Example 15 | Example 16 | Example 17 |
|---|---|---|---|---|---|---|---|---|---|
| Front layer | 1 |  |  |  | FW3E | FW3E | FW3E | FW3E | FW3E |
| Inter-layer | 4 |  |  |  | FB3GT | FB3GT | FB3GT | FB3GT | FB3GT |
| Sealing layer | 1 | Sample used Anti-blocking agent | Type |  | Example 1 Synthetic silica | Example 1 Synthetic silica | Example 1 Magnesium silicate | Example 3 Synthetic silica | Example 4 Synthetic silica |
|  |  |  | Treatment |  | Nil | Citric acid | Nil | Citric acid | Citric acid |
|  |  |  | Average particle size | μm | 2.7 | 2.7 | 3.0 | 2.7 | 2.7 |
|  |  |  | Pore volume | ml/g | 0.8 | 1.0 | 0.7 | 1.0 | 1.0 |
|  |  |  | Concentration | Parts by weight | 0.15 | 0.15 | 0.15 | 0.15 | 0.15 |
|  |  | Lubricant [A] | Type |  | EA | EA | EA | EA | EA |
|  |  |  | Concentration | Parts by weight | 0.04 | 0.04 | 0.04 | 0.04 | 0.04 |
|  |  | Lubricant [B] | Type |  | BA | BA | BA | BA | BA |
|  |  |  | Concentration | Parts by weight | 0.08 | 0.08 | 0.08 | 0.08 | 0.08 |
| HAZE |  |  |  | % | 2.4 | 2.2 | 2.5 | 2.1. | 2.0 |
| Slipping property | 23° C.-1 day *1 |  |  |  | 0.56 | 0.50 | 0.52 | 0.51 | 0.50 |
|  | 40° C.-7 days *1 |  |  |  | 0.18 | 0.12 | 0.13 | 0.12 | 0.12 |
| Blocking property | 40° C.-1 day *1 |  |  | g/10 cm² | 200 | 150 | 200 | 150 | 150 |
|  | 40° C.-7 days *1 |  |  |  | 50 | 50 | 50 | 50 | 50 |
| HS property |  |  |  | °C./300 g | 118.6 | 118.8 | 118.8 | 119.1 | 119.0 |

*1: Sealing surfaces to each other

EXAMPLE 18

To 100 parts by weight of a propylene type resin composition prepared by adding 9.97 parts by weight of a propylene/1-butylene type elastomer (Toughmer XR110T, manufactured by Mitsui Chemicals, Inc.; 1-butene content: 31 mol %) and 0.3 part by weight of a polyethylene wax (Mitsui Hiwax 400P, viscosity at 140° C.: 650 cps) to 89.73 parts by weight of the propylene/ethylene random copolymer (copolymer A1) obtained by the above described method of Polymerization 1, 0.05 part by weight of Irganox 1010 (tetrakis[methylene-3-(3',5'-di-t-butyl-4-hydroxyphenyl)propionate]methane) and 0.05 part by weight of Irgaphos 168 (tris-(2,4-di-t-butylphenyl) phosphite), as antioxidants, and 0.05 part by weight of calcium stearate as a neutralizing agent, were added, and the mixture thereby obtained was mixed at a high speed of 750 rpm for one minute at room temperature by a Henschel mixer, and then melted and kneaded at 230° C. by a twin screw extruder (Ikegai PCM30), followed by cooling and cutting to obtain a pelletized resin composition.

Using this resin composition as a feed material and using a T-die method film forming apparatus equipped with an extruder having an aperture of 35 mm in diameter, a T-die having a width of 300 mm, an air knife and a cooling roll, molding was carried out at an extruded resin temperature of 230° C., at three levels of the cooling roll temperature of 25° C., 35° C. and 45° C. and at a film take-up speed of 21 m/min, to obtain non-stretched films having a thickness of 25 μm. The physical properties were evaluated, and the results were as shown in Tables 8 and 9.

EXAMPLE 19

The test was carried out in the same manner as in Example 18 except that the propylene/ethylene random copolymer (copolymer A1) was 89.1 parts by weight, the propylene/1-butene type elastomer (Toughmer XR110T, manufactured by Mitsui Chemicals, Inc.) was 9.9 parts by weight, and the polyethylene wax (Mitsui Hiwax 400P) was 1.0. The results were as shown in Tables 8 and 9.

EXAMPLE 20

The test was carried out in the same manner as in Example 19 except that copolymer A1 was 79.2 parts by weight, the propylene/1-butene type elastomer (Toughmer XR110T, manufactured by Mitsui Chemicals, Inc.) was 19.8 parts by weight. The results were as shown in Tables 8 and 9.

EXAMPLE 21

The test was carried out in the same manner as in Example 18 except that the polyethylene wax was changed to 0.3 part by weight of Mitsui Hiwax 800P (viscosity at 140° C.: 8,000 cps). The results were as shown in Tables 8 and 9.

EXAMPLE 22

The test was carried out in the same manner as in Example 19 except that the polyethylene wax was changed to 1 part by weight of Sanyo Sanwax LEL800 (viscosity at 140° C.: 22,000 cps). The results were as shown in Tables 8 and 9.

EXAMPLE 23

The test was carried in the same manner as in Example 19 except that the ethylene/1-butene type elastomer (Toughmer A4085. manufactured by Mitsui Chemicals, Inc., 1-butene content: 11 mol %) was 99 parts by weight The results were as shown in Tables 8 and 9.

Comparative Example 8

The test was carried out in the same manner as in Example 18 except that no polyethylene wax was added, and the composition was as shown in Table 10. The results were as shown in Tables 10 and 11. As compared with the one having the polyethylene wax added, the transparency was poor, and the cooling roll temperature dependency was observed.

Comparative Example 9

The test was carried out in the same manner as in Example 18 except that the composition of the propylene/ethylene random copolymer, the propylene/butene type elastomer and the polyethylene wax was as shown in Table 10. the results were as shown in Tables 10 and 11. The polyethylene wax formed a continuous phase, whereby the transparency deteriorated.

Comparative Example 10

Using a propylene type resin composition prepared by adding 9.9 parts by weight of a propylene type elastomer (Toughmer XR110T, manufactured by Mitsui Chemicals, Inc.) and 1.0 part by weight of a polyethylene wax (Mitsui Hiwax 800P) to 89.1 parts by weight of the propylene/ethylene random copolymer A2, the test was carried out in the same manner as in Example 18. The results were as shown in Tables 12 and 13.

Comparative Example 11

Using a propylene type resin composition prepared by adding 9.9 parts by weight of a propylene type elastomer (Toughmer XR110T, manufactured by Mitsui Chemicals, Inc.) and 1.0 part by weight of a polyethylene wax (Mitsui Hiwax 800P) to 89.1 parts by weight of the propylene/ethylene random copolymer A3, the test was carried out in the same manner as in Example 18. The results were as shown in Tables 12 and 13.

Comparative Example 12

Using a propylene type resin composition prepared by adding 9.9 parts by weight of a propylene type elastomer (Toughmer XR110T, manufactured by Mitsui Chemicals, Inc.) and 1.0 part by weight of a polyethylene wax (Mitsui Hiwax 800P) to 89.1 parts by weight of the propylene/ethylene random copolymer A4, the test was carried out in the same manner as in Example 18. The results were as shown in Tables 12 and 13.

Comparative Example 13

Using a propylene type resin composition prepared by adding 9.9 parts by weight of a propylene type elastomer (Toughmer XR110T, manufactured by Mitsui Chemicals, Inc.) and 1.0 part by weight of a polyethylene wax (Mitsui Hiwax 720P, viscosity at 140° C.: 6,000, density: 0.92 g/cm$^3$) to 89.1 parts by weight of the propylene/ethylene random copolymer A1, the test was carried out in the same manner as in Example 18. The results were as shown in Tables 12 and 13.

To 100 parts by weight of the propylene type resin composition shown in Example 18, 20 or 22, 0.05 part by weight of Irganox 1010 (tetrakis[methylene-3-(3',5'-di-t-butyl-4-hydroxyphenyl)propionate]methane) and 0.05 part by weight of Irgaphos 168 (tris-(2,4-di-t-butylphenyl) phosphite), as antioxidants, 0.05 part by weight of calcium stearate as a neutralizing agent, synthetic silica or magnesium silicate as an anti-blocking agent as shown in Table 14, erucic amide (EA) as lubricant [A] and behenic amide (BA) as lubricant [B], were added, and the mixture thereby obtained was mixed at a high speed of 750 rpm for one minute at room temperature by a Henschel mixer, and then melted and kneaded at 230° C. by a twin screw extruder (Ikegai PCM30), followed by cooling and cutting to obtain a pelletized resin composition.

Using this resin composition as a feed material and using a T-die film forming apparatus equipped with an extruder having an aperture of 35 mm in diameter, a T-die having a width of 300 mm, an air knife and a cooling roll, molding was carried out at an extruded resin temperature of 230° C., at two levels of the cooling roll temperature of 35° C. and 45° C. at a film take-up speed of 21 m/min, to obtain non-stretched films having a thickness of 25 μm having corona treatment of 40 dyne/cm applied on one side. The physical properties were evaluated by using films molded at 35° C. and 45° C. for haze and a film molded at 35° C. for other physical properties. The results were as shown in Table 14.

Comparative Example 14

The test was carried out in the same manner as in Example 25 except that the propylene type resin composition of Comparative Example 8 was used in Example 25. The results were as shown in Table 15. Deterioration of the transparency was observed.

EXAMPLES 30 and 31

The film of the propylene type resin composition obtained in Example 25 or 28 (a single layer film obtained by applying corona treatment of 40 dyne/cm on one side) was subjected to aging in an atmosphere of 40° C. for 2 days. Then, using a biaxially stretched polypropylene film of 40 μm as a base material film, a urethane type two pack reactive adhesive was coated, and then dry laminate was carried out on the corona discharge treated surface of the single layer film, and aging was carried out in an atmosphere of 45° C. for 6 days, whereupon evaluation of the slipping property, the blocking property and the heat sealing property of the non-treated surfaces to each other, was carried out. The results were as shown in Table 16.

EXAMPLES 32 to 36

To 100 parts by weight of the propylene type resin composition shown in Example 18, 20 or 22, 0.05 part by weight of Irganox 1010 (tetrakis[methylene-3-(3',5'-di-t-butyl-4-hydroxyphenyl)propionate]methane) and 0.05 part by weight of Irgaphos 168 (tris-(2,4-di-t-butylphenyl) phosphite), as antioxidants, 0.05 part by weight of calcium stearate as a neutralizing agent, synthetic silica or magnesium silicate as an anti-blocking agent as shown in Table 17, erucic amide (EA) as lubricant [A], and behenic amide (BA) as lubricant [B], were added, and the mixture thereby obtained was mixed at a high speed of 750 rpm for one minute at room temperature by a Henschel mixer, and then melted and kneaded at 230° C. by a twin extruder (Ikegai PCM30), followed by cooling and cutting to obtain a pelletized resin composition. Using this resin composition for a sealing layer, a homopolypropylene (FB3GT, trade name, manufactured by Japan Polychem Corporation) having a melting point of 163° C. and a MFR (230° C.) of 7.0 g/10 min for an interlayer and a random polypropylene (FW3E, trade name, manufactured by Japan Polychem Corporation) having a melting point of 140° C. and a MFR (230° C.) of 7.0 g/10 min, and using a three layer T-die method film forming apparatus equipped with three separate extruders for the respective three layers (front layer/interlayer/seal= extruders having apertures of 20 mm in diameter/35 mm in diameter/20 mm in diameter), a three layer T-die having a width of 300 mm communicated thereto, an air knife and a cooling roll, melt three layer coextrusion was carried out at an extruded resin temperature of 230° C. so that the front layer/interlayer/seal layer would be 1/4/1 as shown in Table 17, to obtain a coextruded non-stretched film having a thickness of 30 μm at a film take-up speed of 17 m/min at a cooling roll temperature of 35° C. The physical properties were evaluated, and the results were as shown in Table 17. The lubricating property and the blocking property were evaluated only with respect to the sealing side surfaces.

TABLE 8

| | | | | Example | | | | | |
|---|---|---|---|---|---|---|---|---|---|
| | | | | 18 | 19 | 20 | 21 | 22 | 23 |
| Component (A) | Copolymer A1 | Amount | Parts by weight | 89.73 | 89.1 | 79.2 | 89.73 | 89.1 | 89.1 |
| | | $MI_p$ | g/10 min | 7.2 | 7.2 | 7.2 | 7.2 | 7.2 | 7.2 |
| | | Tm | ° C. | 124.3 | 124.3 | 124.3 | 124.3 | 124.3 | 124.3 |
| | | Tc | ° C. | 88.5 | 88.5 | 88.5 | 88.5 | 88.5 | 88.5 |
| Component (B) | Elastomer | Type | | PBR | → | → | → | → | EBR |
| | | Product name | | XR110T | → | → | → | → | A4085 |
| | | Amount | Parts by weight | 9.97 | 9.9 | 19.8 | 9.97 | 9.9 | 9.9 |
| Component (C) | PE wax | Type | | Hiwax 400P | Hiwax 400P | Hiwax 400P | Hiwax 800P | Sanwax LEL800 | Hiwax 400P |
| | | Amount | Parts by weight | 0.3 | 1 | 1 | 0.3 | 1 | 1 |
| | | Viscosity | cps | 650 | 650 | 650 | 8000 | 22000 | 650 |
| | | Density | g/cm³ | 0.98 | 0.98 | 0.98 | 0.97 | 0.96 | 0.98 |
| Composition | | Tm | ° C. | 125.8 | 126.0 | 124.8 | 125.4 | 126.3 | 126.0 |
| | | Tc | ° C. | 92.0 | 92.0 | 90.0 | 91.3 | 93.3 | 91.8 |

PBR → propylene/butene
EBR → ethylene/butene

TABLE 9

| | | | | Example | | | | | |
|---|---|---|---|---|---|---|---|---|---|
| | | | | 18 | 19 | 20 | 21 | 22 | 23 |
| Physical properties | HAZE | 25° C. | % | 0.4 | 0.3 | 0.4 | 0.4 | 0.3 | 0.5 |
| | | 35° C. | % | 0.6 | 0.4 | 0.6 | 0.7 | 0.5 | 0.6 |
| | | 45° C. | % | 0.9 | 0.8 | 1.0 | 1.0 | 0.7 | 0.9 |
| | Average surface roughness | Ra (A) 25 | nm | 4.0 | 4.0 | 4.0 | 4.0 | 4.0 | 4.0 |
| | | Ra (A) 45 | nm | 18.0 | 18.0 | 18.0 | 18.0 | 18.0 | 18.0 |
| | | Ra (A) 45 − Ra (A) 25 | | 14.0 | 14.0 | 14.0 | 14.0 | 14.0 | 14.0 |
| | | Ra (A + B + C) 25 | nm | 4.6 | 3.6 | 4.0 | 4.6 | 3.5 | 6.3 |
| | | Ra (A + B + C) 45 | nm | 8.2 | 4.9 | 8.0 | 9.6 | 4.9 | 10.5 |
| | | Ra (A + B + C) 45 − Ra (A + B + C) 25 | | 3.6 | 1.3 | 4.0 | 5.0 | 1.4 | 4.2 |
| | HS temp. | | ° C./300 g | 115.1 | 115.2 | 112.9 | 115.0 | 115.0 | 115.2 |
| | Tensile break strength | | kg/cm$^2$ | 540 | 550 | 510 | 540 | 550 | 550 |
| | Extension load (resin pressure) | | kg/cm$^2$ | 188 | 188 | 183 | 187 | 188 | 188 |

TABLE 10

| | | | | Comparative Example | |
|---|---|---|---|---|---|
| | | | | 8 | 9 |
| Component (A) | Copolymer A1 | Amount | Parts by weight | 90.0 | 81.0 |
| | | MI$_p$ | g/10 min | 7.2 | 7.2 |
| | | Tm | ° C. | 124.3 | 124.3 |
| | | Tc | ° C. | 88.5 | 88.5 |
| Component (B) | Elastomer | Type | | PBR | → |
| | | Product name | | XR110T | → |
| | | Amount | Parts by weight | 10.0 | 9.0 |
| Component (C) | PE wax | Type | | Nil | Sanyo Sanwax LEL800 |
| | | Amount | Parts by weight | — | 10 |
| | | Viscosity | cps | — | 22000 |
| | | Density | g/cm$^3$ | — | 0.96 |
| Composition | | Tm | ° C. | 124.9 | 126.6 |
| | | Tc | ° C. | 88.7 | 98.0 |

PBR → propylene/butene

TABLE 11

| | | | | Comparative Example | |
|---|---|---|---|---|---|
| | | | | 8 | 9 |
| Physical properties | HAZE | 25° C. | % | 0.5 | 1.3 |
| | | 35° C. | % | 2.3 | 2.0 |
| | | 45° C. | % | 4.6 | 3.1 |
| | Average surface roughness | Ra (A) 25 | nm | 4.0 | 4.0 |
| | | Ra (A) 45 | nm | 18.0 | 18.0 |
| | | Ra (A) 45 − Ra (A) 25 | | 14.0 | 14.0 |
| | | Ra (A + B + C) 25 | nm | — | 12.3 |
| | | Ra (A + B + C) 45 | nm | — | 18.9 |
| | | Ra (A + B + C) 45 − Ra (A + B + C) 25 | | — | 6.5 |
| | HS temp. | | ° C./300 g | 115.0 | 115.3 |
| | Tensile break strength | | kg/cm$^2$ | 490 | 580 |
| | Extension load (resin pressure) | | kg/cm$^2$ | 188 | 190 |

TABLE 12

|  |  |  |  | Comparative Example | | | |
|---|---|---|---|---|---|---|---|
|  |  |  |  | 10 | 11 | 12 | 13 |
| Component (A) | Copolymer A1, A2, A3, A4 | Amount | Parts by weight | 89.1 | 89.1 | 89.1 | 89.1 |
|  |  | MI$_p$ | g/10 min | 1.5 | 35 | 7.0 | 7.2 |
|  |  | Isotactic | % | 99.6 | 99.0 | 99.8 | 99.6 |
|  |  | 2, 1 | % | 1.2 | 1.0 | 1.3 | 1.2 |
|  |  | 1, 3 | % | 0.09 | 0.15 | 0.08 | 0.09 |
|  |  | Tm | °C. | 124.9 | 125.3 | 146.0 | 124.3 |
|  |  | Tc | °C. | 88.9 | 89.4 | 110.3 | 88.5 |
| Component (B) | Elastomer | Type |  | PBR | PBR | PBR | PBR |
|  |  | Product name |  | XR110T | XR110T | XR110T | XR110T |
|  |  | Amount | Parts by weight | 9.9 | 9.9 | 9.9 | 9.9 |
| Component (C) | PE wax | Type |  | Mitsui Hiwax 800P | Mitsui Hiwax 800P | Mitsui Hiwax 800P | Mitsui Hiwax 720P |
|  |  | Amount | Parts by weight | 1.0 | 1.0 | 1.0 | 1.0 |
|  |  | Viscosity | cps | 8000 | 8000 | 8000 | 6000 |
|  |  | Density | g/cm$^3$ | 0.97 | 0.97 | 0.97 | 0.92 |
| Composition |  | Tm | °C. | 125.9 | 125.8 | 138.6 | 123.9 |
|  |  | Tc | °C. | 92.1 | 92.0 | 101.5 | 88.3 |

PBR → propylene/butene

TABLE 13

|  |  |  |  | Comparative Example | | | |
|---|---|---|---|---|---|---|---|
|  |  |  |  | 10 | 11 | 12 | 13 |
| Physical properties | HAZE | 25° C. |  | % | 0.5 | 0.4 | 0.5 | 0.4 |
|  |  | 35° C. | % | 1.8 | 1.0 | 1.0 | 2.0 |
|  |  | 45° C. | % | 2.0 | 1.3 | 1.4 | 4.5 |
|  | Average surface roughness | Ra (A) 25 | nm | 6.0 | 4.0 | 4.0 | 4.0 |
|  |  | Ra (A) 45 | nm | 22.3 | 17.0 | 18.2 | 18.0 |
|  |  | Ra (A) 45 − Ra (A) 25 |  | 16.3 | 13.0 | 14.2 | 14.0 |
|  |  | Ra (A + B + C) 25 | nm | 6.0 | 4.0 | 4.5 | 4.0 |
|  |  | Ra (A + B + C) 45 | nm | 15.0 | 13.0 | 13.2 | 21.2 |
|  |  | Ra (A + B + C) 45 − Ra (A + B + C) 25 |  | 9.0 | 9.0 | 8.7 | 17.2 |
|  | HS temp. |  | °C./300 g | 115.0 | 115.0 | 133.5 | 115.1 |
|  | Tensile break strength |  | kg/cm$^2$ | 560 | 390 | 600 | 500 |
|  | Extension load (resin pressure) |  | kg/cm$^2$ | 246 | 180 | 195 | 188 |

TABLE 14

|  |  |  |  | Example | | | | | |
|---|---|---|---|---|---|---|---|---|---|
|  |  |  |  | 24 | 25 | 26 | 27 | 28 | 29 |
| Sample used |  |  |  | Ex. 1 | Ex. 1 | Ex. 1 | Ex. 1 | Ex. 3 | Ex. 5 |
| ANti-blocking agent | Type |  |  | Synthetic silica | Synthetic silica | Synthetic silica | Magnesium silicate | Synthetic silica | Synthetic silica |
|  | Treatment |  |  | Nil | Citric acid | Citric acid | Nil | Citric acid | Citric acid |
|  | Average particle size |  | μm | 2.7 | 2.7 | 2.7 | 2.7 | 2.7 | 2.7 |
|  | Pore volume |  | ml/g | 0.8 | 1.0 | 1.0 | 3.0 | 1.0 | 1.0 |
|  | Concentration |  | Parts by weight | 0.15 | 0.15 | 0.15 | 0.15 | 0.15 | 0.15 |
| Lubricant [A] | Type |  |  | EA | EA | Nil | EA | EA | EA |
|  | Concentration |  | Parts by weight | 0.04 | 0.04 | — | 0.04 | 0.04 | 0.04 |

TABLE 14-continued

| | | | Example | | | | | |
|---|---|---|---|---|---|---|---|---|
| | | | 24 | 25 | 26 | 27 | 28 | 29 |
| Lubricant [B] | Type | | BA | BA | BA | BA | BA | BA |
| | Concentration | Parts by weight | 0.08 | 0.08 | 0.08 | 0.08 | 0.08 | 0.08 |
| HAZE | 35° C. | % | 2.7 | 2.2 | 2.2 | 2.6 | 2.1 | 2.0 |
| | 45° C. | | 2.8 | 2.4 | 2.3 | 2.7 | 2.2 | 2.2 |
| Slipping property | 23° C.-1 day | Treated surface/Treated surface | 0.71 | 0.51 | 0.75 | 0.53 | 0.75 | 0.49 |
| | | Non-treated surface/Non-treated surface | 0.69 | 0.49 | 0.69 | 0.50 | 0.71 | 0.45 |
| | 40° C.-7 days | Treated surface/Treated surface | 0.21 | 0.14 | 0.22 | 0.16 | 0.23 | 0.12 |
| | | Non-treated surface/Non-treated surface | 0.19 | 0.11 | 0.16 | 0.14 | 0.20 | 0.10 |
| Blocking property | 40° C.-1 day | Treated surface/Treated surface | g/10 cm² 280 | 200 | 200 | 250 | 250 | 180 |
| | | Non-treated surface/Non-treated surface | 150 | 50 | 50 | 150 | 150 | 0 |
| | 40° C.-7 days | Treated surface/Treated surface | 300 | 220 | 250 | 280 | 350 | 200 |
| | | Non-treated surface/Non-treated surface | 180 | 100 | 150 | 100 | 190 | 50 |
| Heat seal property | | ° C./300 g | 115.3 | 115.4 | 115.2 | 115.2 | 113.0 | 115.8 |

TABLE 15

| | | | Comparative Example 14 |
|---|---|---|---|
| Sample used | | | Comparative Example 8 |
| Anti-blocking agent | Type Treatment | | Synthetic silica Citric acid |
| | Average particle size | μm | 2.7 |
| | Pore volume | ml/g | 1.0 |
| | Concentration | Parts by weight | 0.15 |
| Lubricant [A] | Type | | EA |
| | Concentration | Parts by weight | 0.04 |
| Lubricant [B] | Type | | BA |
| | Concentration | Parts by weight | 0.08 |
| HAZE | 35° C. | % | 2.7 |
| | 45° C. | | 5.0 |
| Slipping property | 23° C.-1 day | Treated surface/Treated surface | 0.49 |
| | | Non-treated surface/Non-treated surface | 0.48 |
| | 40° C.-7 days | Treated surface/Treated surface | 0.11 |
| | | Non-treated surface/Non-treated surface | 0.09 |
| Blocking property | 40° C.-1 day | Treated surface/Treated surface | g/10 cm² 150 |
| | | Non-treated surface/Non-treated surface | 50 |
| | 40° C.-7 days | Treated surface/Treated surface | 220 |
| | | Non-treated surface/Non-treated surface | 100 |
| Heat seal property | | ° C./300 g | 115.3 |

TABLE 16

| | | | Example | |
|---|---|---|---|---|
| | | | 30 | 31 |
| Sample used | | | OPP/Example 25 | OPP/Example 28 |
| Slipping property | 45° C.-6 days | Non-treated surface/Non-treated surface | 0.10 | 0.16 |
| Blocking property | 45° C.-6 days | Non-Treated surface/Non-treated surface | g/10 cm² 50 | 100 |
| Heat seal property | | ° C./300 g | 115.1 | 112.9 |

TABLE 17

| Material constitution | | | | Example | | | | |
|---|---|---|---|---|---|---|---|---|
| Layer ratio | | | | 32 | 33 | 34 | 35 | 36 |
| Front layer | 1 | | | FW3E | FW3E | FW3E | FW3E | FW3E |
| Inter-layer | 4 | | | FB3GT | FB3GT | FB3GT | FB3GT | FB3GT |
| Sealing layer | 1 | Sample used | | Ex. 18 | Ex. 18 | Ex. 18 | Ex. 20 | Ex. 22 |
| | | Anti-blocking agent | Type | Synthetic silica | Synthetic silica | Magnesium silicate | Synthetic silica | Synthetic silica |
| | | | Treatment | Nil | Citric acid | Nil | Citric acid | Citric acid |
| | | | Average particle size μm | 2.7 | 2.7 | 3.0 | 2.7 | 2.7 |
| | | | Pore volume ml/g | 0.8 | 1.0 | 0.7 | 1.0 | 1.0 |
| | | | Concentration Parts by weight | 0.15 | 0.15 | 0.15 | 0.15 | 0.15 |
| | | Lubricant [A] | Type | EA | EA | EA | EA | EA |
| | | | Concentration Parts by weight | 0.04 | 0.04 | 0.04 | 0.04 | 0.04 |
| | | Lubricant [B] | Type | BA | BA | BA | BA | BA |
| | | | Concentration Parts by weight | 0.08 | 0.08 | 0.08 | 0.08 | 0.08 |
| HAZE | | | % | 2.7 | 2.2 | 2.6 | 2.1 | 2.0 |
| Slipping property | | 23° C.-1 day *1 | | 0.69 | 0.58 | 0.57 | 0.71 | 0.55 |
| | | 40° C.-7 days *1 | | 0.19 | 0.13 | 0.13 | 0.20 | 0.12 |
| Blocking property | | 40° C.-1 day *1 | g/10 cm² | 150 | 100 | 150 | 150 | 50 |
| | | 40° C.-7 days *1 | | 150 | 100 | 100 | 200 | 100 |
| HS property | | | ° C./300 g | 115.2 | 115.2 | 115.2 | 112.6 | 115.4 |

*1 Sealing surfaces to each other

The entire disclosure of Japanese Patent Application No. 2000-211751 filed on Jul. 12, 2000 and Japanese Patent Application No. 2000-211752 filed on Jul. 12, 2000 including specifications, claims, drawings and summaries are incorporated herein by reference in their entireties.

What is claimed is:

1. A propylene resin containing composition, comprising:
   (A) from 95.0 to 99.999 parts by weight of a propylene/α-olefin random copolymer polymerized in the presence of a metallocene catalyst, and
   (C) from 0.001 to 5.0 parts by weight of a polyethylene wax,
   wherein component (A) has a melt index of 2 to 30 g/10 min at 230° C., and a main melting peak temperature (Tm) obtained by DSC of 110 to 145° C.; and
   wherein component (C) has a density of 0.94 to 0.98 g/cm³, and a melt viscosity of at least 10 cps at 140° C.

2. The propylene resin containing composition according to claim 1, wherein said metallocene catalyst for component (A) is a compound of the following formula (1) or its partially hydrogenated product:

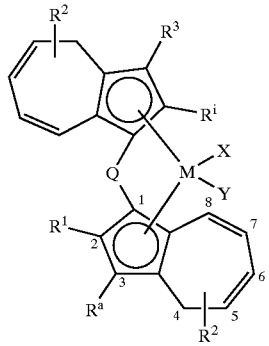

(1)

wherein
Q is a linking group which links the two conjugated five-membered cyclic ligands,
M is a metal atom selected from the group consisting of titanium, zirconium and hafnium,
each of X and Y is a hydrogen atom, a halogen atom, a hydrocarbon group, an alkoxy group, an amino group, a nitrogen-containing hydrocarbon group, a phosphorus-containing hydrocarbon group or a silicon-containing hydrocarbon group,
each of $R^1$ and $R^3$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group, and
each $R^2$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group.

3. The propylene resin containing composition according to claim 1, further comprising: a fatty acid amide in an amount of from 0.01 to 1.0 parts by weight per 100 parts by weight of said propylene resin containing composition.

4. The propylene resin containing composition according to claim 1, further comprising:
   a) an unsaturated fatty acid amide having a melting point of from 70 to 90° C., or
   b) a saturated fatty acid amide having a melting point of from 100 to 125° C., or
   c) a mixture of a) and b);
   wherein a), b) and c) are present in an amount of from 0.01 to 1.0 parts by weight per 100 parts by weight of said propylene resin containing composition.

5. The propylene resin containing composition according to claim 1, further comprising:
an anti-blocking agent having an average particle size of from 1.0 to 7.0 µm and a pore volume of from 0.4 to 1.6 ml/g, in an amount of from 0.01 to 0.7 parts by weight per 100 parts by weight of said propylene resin containing composition.

6. The propylene resin containing composition according to claim 5, wherein said anti-blocking agent is surface-treated with an organic substance.

7. The propylene resin containing composition according to claim 5, wherein said anti-blocking agent is surface-treated with citric acid.

8. A propylene resin containing film molded from said propylene resin containing composition according to claim 1 using a T-die.

9. A laminated resin film, comprising:
at least one layer which comprises said propylene resin containing film according to claim 8.

10. A propylene resin containing composition, comprising:
(A) from 50 to 98 parts by weight of a propylene/α-olefin random copolymer polymerized in the presence of a metallocene catalyst,
(B) from 2 to 50 parts by weight of (B-1) a propylene elastomer or (B-2) an ethylene elastomer, and
(C) from 0.001 to 5.0 parts by weight of a polyethylene wax,
wherein component (A) has a melt index of 2 to 30 g/10 min at 230° C., and a main melting peak temperature (Tm) obtained by DSC of 110 to 145° C.;
wherein said propylene elastomer (B-1) is a propylene/α-olefin copolymer in which a content of units derived from propylene is 5 to 95 mol %, and wherein a content of units derived from a $C_{4-20}$-α-olefin is 5 to 95 mol %,
wherein said ethylene elastomer (B-2) is an ethylene/α-olefin copolymer in which a content of units derived from ethylene is 5 to 95 mol %, and wherein a content of units derived from an α-olefin is 5 to 95 mol %; and
wherein component (C) has a density of 0.94 to 0.98 g/cm³, and a melt viscosity of a length least 10 cps at 140° C.

11. The propylene resin containing composition according to claim 10, wherein said metallocene catalyst for component (A) is a compound of the following formula (1) or its partially hydrogenated product:

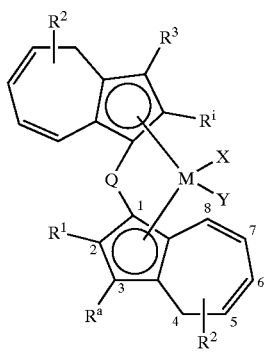

(1)

wherein

Q is a linking group which links the two conjugated five-membered cyclic ligands, M is a metal atom selected from the group consisting of titanium, zirconium and hafnium, each of X and Y is a hydrogen atom, a halogen atom, a hydrocarbon group, an alkoxy group, an amino group, a nitrogen-containing hydrocarbon group, a phosphorus-containing hydrocarbon group or a silicon-containing hydrocarbon group, each of $R^1$ and $R^3$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group, and each $R^2$ is a hydrogen atom, a $C_{1-20}$ hydrocarbon group, a halogen atom, a $C_{1-20}$ halogenated hydrocarbon group, a silicon-containing hydrocarbon group, a nitrogen-containing hydrocarbon group, an oxygen-containing hydrocarbon group, a boron-containing hydrocarbon group or a phosphorus-containing hydrocarbon group.

12. The propylene containing resin composition according to claim 10, further comprising:
a fatty acid amide in an amount of from 0.01 to 1.0 parts by weight per 100 parts by weight of said propylene resin containing composition.

13. The propylene resin containing composition according to claim 10, further comprising:
a) an unsaturated fatty acid amide having a melting point of from 70 to 90° C., or
b) a saturated fatty acid amide having a melting point of from 100 to 125° C., or
c) a mixture of a) and b);
wherein a), b) and c) are present in an amount of from 0.01 to 1.0 parts by weight per 100 parts by weight of said propylene resin containing composition.

14. The propylene resin containing composition according to claim 10, further comprising:
an anti-blocking agent having an average particle size of from 1.0 to 7.0 µm and a pore volume of from 0.4 to 1.6 ml/g in an amount of from 0.01 to 0.7 parts by weight per 100 parts by weight of said propylene resin containing composition.

15. The propylene resin containing composition according to claim 14, wherein said anti-blocking agent is surface-treated with an organic substance.

16. The propylene resin containing composition according to claim 14, wherein said anti-blocking agent is surface-treated with citric acid.

17. A propylene resin containing film molded from said propylene resin containing composition according to claim 10 using a T-die.

18. A laminated resin film, comprising:
at least one layer which comprises said propylene resin containing film according to claim 17.

* * * * *